(12) United States Patent
Yung et al.

(10) Patent No.: US 11,965,275 B2
(45) Date of Patent: Apr. 23, 2024

(54) METHOD FOR FORMING NANOFIBER NONWOVEN PRODUCTS

(71) Applicant: Ascend Performance Materials Operations LLC, Houston, TX (US)

(72) Inventors: Wai-Shing Yung, Pensacola, FL (US); Chris Schwier, Pensacola, FL (US); Albert Ortega, Pensacola, FL (US); Scott E. Osborn, Pensacola, FL (US)

(73) Assignee: Ascend Performance Materials Operations LLC, Houston, TX (US)

( * ) Notice: Subject to any disclaimer, the term of this patent is extended or adjusted under 35 U.S.C. 154(b) by 83 days.

(21) Appl. No.: 17/388,544

(22) Filed: Jul. 29, 2021

(65) Prior Publication Data

US 2021/0355617 A1 Nov. 18, 2021

Related U.S. Application Data

(63) Continuation of application No. 16/434,918, filed on Jun. 7, 2019, now Pat. No. 11,111,614.
(Continued)

(51) Int. Cl.
*D01D 5/088* (2006.01)
*D01D 5/096* (2006.01)
(Continued)

(52) U.S. Cl.
CPC .............. *D04H 3/16* (2013.01); *D01D 5/096* (2013.01); *D04H 3/009* (2013.01);
(Continued)

(58) Field of Classification Search
CPC ........ D01D 5/088; D01D 5/0985; D01D 7/00; D01F 6/60; D04H 3/009; D10B 2331/02
(Continued)

(56) References Cited

U.S. PATENT DOCUMENTS 3,016,599 A    1/1962  Perry, Jr.
3,704,198 A    11/1972 Prentice
(Continued)

FOREIGN PATENT DOCUMENTS

CN    107366030 A    11/2017
JP    08144166       6/1996
(Continued)

OTHER PUBLICATIONS

Translation of JP 2011031362 A (published on Feb. 17, 2011).*
(Continued)

*Primary Examiner* — Leo B Tentoni
(74) *Attorney, Agent, or Firm* — COZEN O'CONNOR

(57) ABSTRACT

A method for tuning characteristics of a polyamide nanofiber nonwoven comprising the step of targeting a specific average nanofiber diameter and/or a specific relative viscosity for the polyamide nanofiber nonwoven. The specific average nanofiber diameter is within a range from 100 nm to 1000 nm and/or the specific relative viscosity is within a range from 5 to 75, e.g., from 15 to 50. The process further comprises the steps of extruding a polyamide composition having a moisture content with a pressurized gas through a fiber forming channel having a channel temperature to form the polyamide nanofiber nonwoven having the target average nanofiber diameter and/or relative viscosity and controlling the moisture content, the pressure of pressurized gas, and/or the channel temperature based on the specific average nanofiber diameter and/or the specific relative viscosity.

13 Claims, 8 Drawing Sheets

Related U.S. Application Data

(60) Provisional application No. 62/682,465, filed on Jun. 8, 2018.

(51) Int. Cl.
| | |
|---|---|
| *D01D 7/00* | (2006.01) |
| *D01F 6/60* | (2006.01) |
| *D04H 3/009* | (2012.01) |
| *D04H 3/16* | (2006.01) |
| *D01D 5/098* | (2006.01) |

(52) U.S. Cl.
CPC ............ *B29C 2948/92514* (2019.02); *B29C 2948/92704* (2019.02); *B29C 2948/92723* (2019.02); *D01D 5/0985* (2013.01); *D10B 2331/02* (2013.01)

(58) Field of Classification Search
USPC ................. 264/103, 211.12, 331.19, 555
See application file for complete search history.

(56) References Cited

U.S. PATENT DOCUMENTS

| | | | |
|---|---|---|---|
| 3,755,527 A | 8/1973 | Keller et al. | |
| 3,849,241 A | 11/1974 | Butin et al. | |
| 3,978,185 A | 8/1976 | Buntin et al. | |
| 4,100,324 A | 7/1978 | Anderson et al. | |
| 4,118,531 A | 10/1978 | Hauser | |
| 4,663,220 A | 5/1987 | Wisneski et al. | |
| 4,760,129 A | 7/1988 | Haering et al. | |
| 5,116,919 A | 5/1992 | Buzinkai et al. | |
| 5,504,185 A | 4/1996 | Toki et al. | |
| 5,543,495 A | 8/1996 | Anolick et al. | |
| 5,698,658 A | 12/1997 | Dujari et al. | |
| 5,913,993 A | 6/1999 | Ortega et al. | |
| 6,011,134 A | 1/2000 | Marks et al. | |
| 6,136,947 A | 10/2000 | Wiltzer et al. | |
| 6,169,162 B1 | 1/2001 | Bush et al. | |
| 6,743,273 B2 | 6/2004 | Chung et al. | |
| 6,846,450 B2 | 1/2005 | Erickson et al. | |
| 6,858,057 B2 | 2/2005 | Healey | |
| 7,138,482 B2 | 11/2006 | Tanaka et al. | |
| 7,300,272 B1 | 11/2007 | Haggard | |
| 7,381,788 B2 | 6/2008 | Tsujii et al. | |
| 7,504,348 B1 | 3/2009 | Hagewood et al. | |
| 7,740,777 B2 | 6/2010 | Wilkie et al. | |
| 7,757,811 B2 | 7/2010 | Fox et al. | |
| 7,905,973 B2 | 3/2011 | Stelter et al. | |
| 7,927,540 B2 | 4/2011 | Smithies et al. | |
| 8,241,024 B2 | 8/2012 | Hartge | |
| 8,282,712 B2 | 10/2012 | Chi et al. | |
| 8,303,693 B2 | 11/2012 | Leung | |
| 8,608,817 B2 | 12/2013 | Wertz et al. | |
| 8,658,067 B2 | 2/2014 | Peno et al. | |
| 8,668,854 B2 | 3/2014 | Marshall et al. | |
| 8,679,218 B2 | 3/2014 | Wertz et al. | |
| 8,759,475 B2 | 6/2014 | Thierry et al. | |
| 8,777,599 B2 | 7/2014 | Peno et al. | |
| 8,808,594 B1 | 8/2014 | Marshall et al. | |
| 9,101,860 B2 | 8/2015 | Green et al. | |
| 9,149,748 B2 | 10/2015 | Nagy et al. | |
| 9,177,729 B2 | 11/2015 | Kim et al. | |
| 9,462,390 B2 | 10/2016 | Lee et al. | |
| 9,464,369 B2 | 10/2016 | Isele et al. | |
| 9,950,284 B2 | 4/2018 | Thomson et al. | |
| 10,155,186 B2 | 12/2018 | Cox et al. | |
| 10,155,187 B2 | 12/2018 | Wertz et al. | |
| 2003/0137069 A1 | 7/2003 | Renaker | |
| 2004/0035095 A1 | 2/2004 | Healey | |
| 2004/0255783 A1 | 12/2004 | Graham et al. | |
| 2004/0266300 A1 | 12/2004 | Isele et al. | |
| 2005/0235619 A1 | 10/2005 | Heinz et al. | |
| 2006/0084341 A1* | 4/2006 | Bodaghi ............. | D01D 5/0985 442/361 |
| 2008/0023888 A1 | 1/2008 | Brang et al. | |
| 2008/0284050 A1 | 11/2008 | Mares et al. | |
| 2008/0307766 A1 | 12/2008 | Petras et al. | |
| 2009/0199717 A1 | 8/2009 | Green et al. | |
| 2012/0318754 A1 | 12/2012 | Cox et al. | |
| 2013/0180917 A1 | 7/2013 | Chu et al. | |
| 2014/0097558 A1 | 4/2014 | Lustenberger | |
| 2015/0107457 A1 | 4/2015 | Huang et al. | |
| 2015/0111019 A1 | 4/2015 | Huang et al. | |
| 2015/0145175 A1 | 5/2015 | Lustenberger | |
| 2017/0304755 A1 | 10/2017 | Bansal et al. | |
| 2017/0361254 A1 | 12/2017 | Huang et al. | |
| 2018/0037718 A1 | 2/2018 | Audenaert et al. | |
| 2018/0371656 A1 | 12/2018 | Yung et al. | |
| 2019/0194847 A1* | 6/2019 | Schoots ................. | D04H 3/009 |

FOREIGN PATENT DOCUMENTS

| | | | |
|---|---|---|---|
| JP | 2011031362 A * | 2/2011 | ............ B24B 37/00 |
| JP | 2011031362 A | 2/2011 | |
| JP | 2013155460 A | 8/2013 | |
| JP | 2017075412 A | 4/2017 | |
| WO | 2005004769 | 1/2005 | |
| WO | 2014074818 | 5/2014 | |
| WO | 2015003170 | 1/2015 | |
| WO | 2015153477 | 10/2015 | |
| WO | 2017214085 | 12/2017 | |

OTHER PUBLICATIONS

Peng Wenjuan et al., "Practice and research of high performance fibers prepared by flexible chain polymers" Conference Name: Tongniu Cup Ninth Symposium on Functional Textiles and Nanotechnology, Wanfang Online Publishing Date: Mar. 12, 2010, pp. 124-129.

Bresee et al., Fiber Formation During Melt Blowing, International Nonwoven Journal, Summer, 2003, pp. 21-28.

Ellison et al., Melt Blown Nanofibers: Fiber Diameter Distributions and Onset of Fiber Breakup, Polymer, vol. 48, No. 11, May 21, 2007, pp. 3306-3316.

Hassan et al., Fabrication of Nanofiber Meltblown Membranes and Their Filtration Properties, Journal of Membrane Science, vol. 427, Jan. 15, 2013, pp. 336-344.

Kirk-Othmer, Encyclopedia of Chemical Technology, vol. 18, 3rd Edition, 1982, pp. 328-371.

International Application No. PCT/US2019/036080, International Search Report and Written Opinion dated Nov. 25, 2019, 20 pages.

Chen et al., "Effects of Processing Parameters on the Fiber Diameter of Melt Blown Nonwoven Fabrics", Textile Research Journal, vol. 75, No. 1, Jan. 1, 2005, pp. 76-80.

International Application No. PCT/US2019/036080, "Invitation to Pay Additional Fees and, Where Applicable, Protest Fee", Oct. 1, 2019, 15 pages.

* cited by examiner

Schematic of typical melt blowing process.

METHOD FOR FORMING NANOFIBER NONWOVEN PRODUCTS

CROSS-REFERENCE TO RELATED APPLICATION

This application is a continuation of U.S. Pat. No. 11,111, 614, filed on Jun. 7, 2019, which claims priority from U.S. Provisional Application No. 62/682,465, entitled "Tunable Nanofiber Nonwoven Products," filed Jun. 8, 2018, the disclosure of which is incorporated herein by reference in its entirety.

TECHNICAL FIELD

The present invention relates to tunable processes for making polyamide nanofiber nonwoven products, which are useful for air and liquid filtration, breathable fabrics for apparel, acoustics, composites and packaging, as well as other applications.

BACKGROUND

Polymer membranes, including nanofiber and microfiber nonwovens are known in the art and are used for a variety of purposes, including in connection with filtration media and apparel. Known techniques for forming finely porous polymer structures include xerogel and aerogel membrane formation, electrospinning, melt-blowing, as well as centrifugal-spinning with a rotating spinneret and two-phase polymer extrusion through a thin channel using a propellant gas. These techniques are either expensive or do not form nanofibers, e.g., polyamide nanofibers, with acceptable fiber diameter distributions. Electrospinning, for example, is a relatively expensive process and current melt-blowing techniques, while less expensive, do not attain the nanofiber size that electrospinning can attain.

US Pub. No. 2014/0097558 relates generally to methods of manufacturing a filtration media, such as a personal protection equipment mask or respirator, which incorporates an electrospinning process to form nanofibers onto a convex mold, which may, for example, be in the shape of a human face. See, also, US Pub. No. 2015/0145175 A1.

WO 2014/074818 discloses nanofibrous meshes and xerogels used for selectively filtering target compounds or elements from a liquid. Also described are methods for forming nanofibrous meshes and xerogels, methods for treating a liquid using nanofibrous meshes and xerogels, and methods for analyzing a target compound or element using nanofibrous meshes and xerogels. The nanofibers are comprised of polysiloxanes.

WO 2015/003170 relates to nonwoven textiles consisting of webs of superfine fibers, i.e., fibers with diameters in nanoscale or micronscale ranges, for use in articles that have, for example a predetermined degree of waterproofness with breathability, or windproofness with breathability. The fibers may comprise polyurethane-based material or polytetrafluoroethylene.

WO 2015/153477 relates to a fiber construct suitable for use as a fill material for insulation or padding, comprising: a primary fiber structure comprising a predetermined length of fiber; a secondary fiber structure, the secondary fiber structure comprising a plurality of relatively short loops spaced along a length of the primary fiber. Among the techniques enumerated for forming the fiber structures include electrospinning, melt-blowing, melt-spinning and centrifugal-spinning. The products are reported to mimic goose-down, with fill power in the range of 550 to 900.

Despite the variety of techniques and materials proposed, the desirable ability to adjust, control, or otherwise set properties and characteristics of the end products has not been sufficiently contemplated. Further, conventional products and processes leave much to be desired in terms of manufacturing costs, processability, and product properties.

SUMMARY OF INVENTION

In one embodiment, the present disclosure is directed to a method for tuning characteristics of a polyamide nanofiber nonwoven comprising the steps of targeting a specific average nanofiber diameter and/or a specific relative viscosity for the polyamide nanofiber nonwoven, wherein the specific average nanofiber diameter is within a range from 100 nm to 1000 nm, e.g., from 200 nm to 700 nm, and/or the specific relative viscosity is within a range from 5 to 75, e.g., from 15 to 50 or from 20 to 40, extruding a polyamide composition having a moisture content with a pressurized gas through a fiber forming channel having a channel temperature to form the polyamide nanofiber nonwoven having the target average nanofiber diameter and/or relative viscosity, and controlling the moisture content, the pressure of pressurized gas, and/or the channel temperature based on the specific average nanofiber diameter and/or the specific relative viscosity. In one embodiment, the moisture content of the polyamide composition, i.e. starting resin, is controlled from 0.005 wt. % to 1 wt. %, e.g., from 0.005 wt. % to 0.5 wt. %, from 0.02 to 0.3 wt. %, to target the specific average nanofiber diameter and/or specific relative viscosity. The moisture content of the polyamide composition may be controlled by drying the polyamide composition to have a moisture content of less than 0.02 wt. %, and rehydrating the dried polyamide composition. In one embodiment, the pressure of the pressurized gas is controlled to range from 160 kPa to 220 kPa to target the specific average nanofiber diameter and/or specific relative viscosity. In one embodiment, the channel temperature (die temperature), is controlled to range from 270° C. to 330° C., e.g., from 270° C. to 315° C., to target the specific average nanofiber diameter and/or specific relative viscosity. The fiber forming channel may be a die and/or a capillary. In one embodiment, the polyamide nanofiber nonwoven is melt-blown and/or is free of solvent. In some embodiments, the polyamide composition may comprise a catalyst.

In another embodiment, the present disclosure is directed to a method for tuning the relative viscosity of a polyamide nanofiber nonwoven comprising the steps of targeting a specific relative viscosity for the polyamide nanofiber nonwoven, wherein the specific relative viscosity is within a range from 5 to 75, e.g., from 15 to 50 or from 20 to 40, extruding a polyamide composition having a moisture content to form the polyamide nanofiber nonwoven having the target relative viscosity, and controlling the moisture content based on the target relative viscosity. In one embodiment, the moisture content of the polyamide composition, i.e. starting resin, is controlled from 0.005 wt. % to 1 wt. %, e.g., from 0.005 wt. % to 0.5 wt. %, from 0.02 to 0.3 wt. %, to target the specific relative viscosity, for example a specific relative viscosity within the range from 5 to 75, e.g., from 15 to 50 or from 20 to 40. The moisture content of the polyamide composition may be controlled by drying the polyamide composition to have a moisture content of less than 0.02 wt. %, and rehydrating the dried polyamide composition. In one embodiment, the polyamide composition may be extruded through a fiber forming channel having a channel temperature and the channel temperature is controlled to range from 270° C. to 330° C. In one embodiment, the polyamide nanofiber nonwoven is melt-blown and/or is free of solvent. In some embodiments, the polyamide composition may comprise a catalyst.

In another embodiment, the present disclosure provides a method for tuning the nanofiber diameter of a polyamide nanofiber nonwoven comprising the steps of targeting a specific average nanofiber diameter, wherein the specific average nanofiber diameter is within a range from 100 nm to 1000 nm, e.g., from 200 to 700 nm, extruding a polyamide composition with a pressurized gas to form the polyamide nanofiber nonwoven having the target average nanofiber diameter, and controlling the pressure of the pressurized gas based on the target average nanofiber diameter. In one embodiment, the pressurized gas may be controlled to range from 160 kPa to 220 kPa. In one embodiment, the polyamide composition may be extruded through a fiber forming channel having a channel temperature and the channel temperature is controlled to range from 270° C. to 330° C. In one embodiment, the polyamide nanofiber nonwoven is melt-blown and/or is free of solvent. In some embodiments, the polyamide composition may comprise a catalyst. In one embodiment, the moisture content of the polyamide composition, i.e. starting resin, is controlled from 0.005 wt. % to 1 wt. %, e.g., from 0.005 wt. % to 0.5 wt. %, from 0.02 to 0.3 wt. %, target the specific average nanofiber diameter.

BRIEF DESCRIPTION OF DRAWINGS

The invention is described in detail below with reference to the drawings wherein like numerals designate similar parts and wherein.

DETAILED DESCRIPTION

Overview

Figure 1:
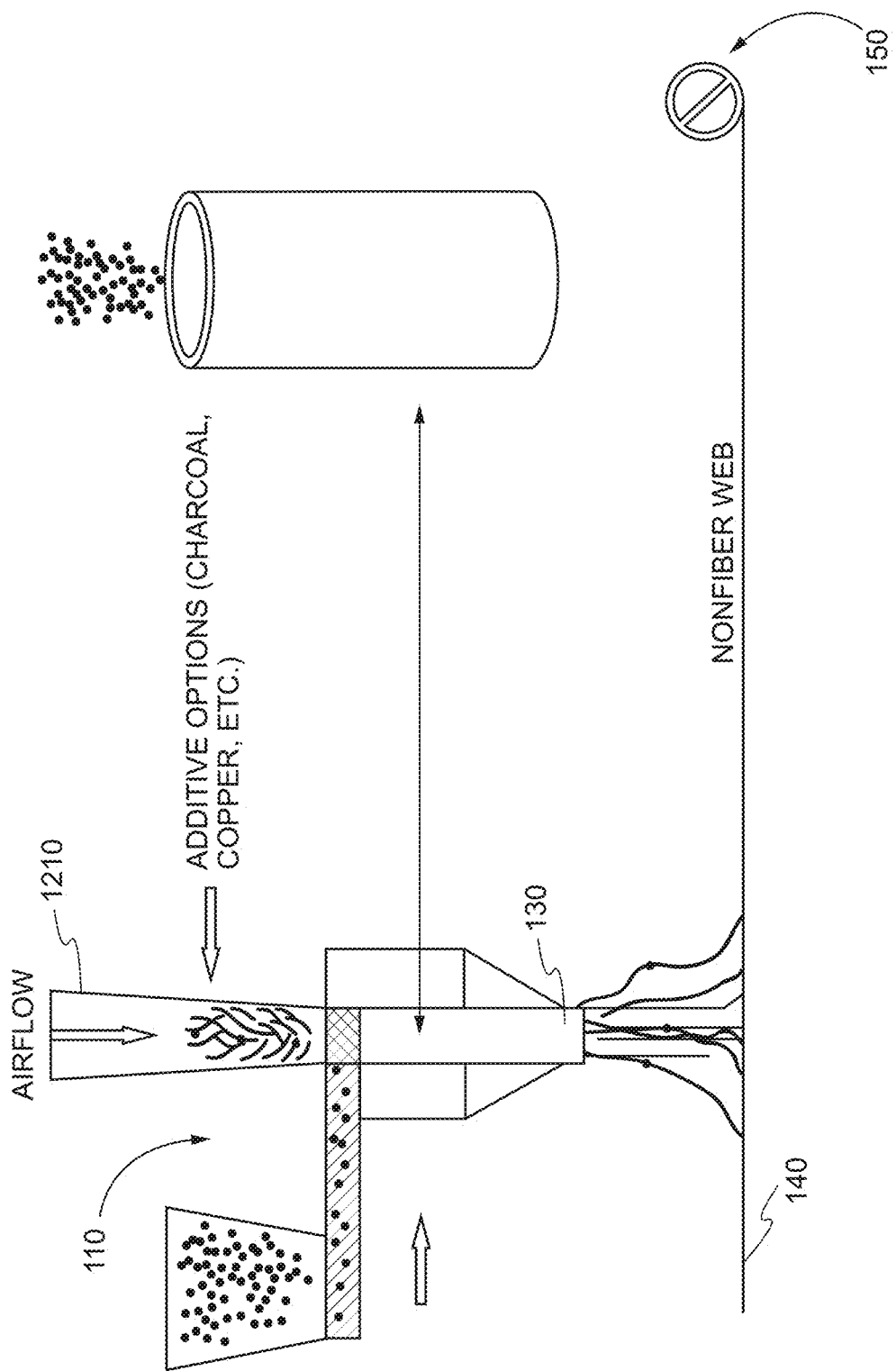
FIG. 1 and FIG. 2 are separate schematic diagrams of a 2-phase propellant-gas spinning system useful in connection with the present invention.

As noted above, some conventional processes for producing nonwovens are known. But these conventional techniques are either expensive and/or cannot obtain high production rates, e.g., electrospinning, or do not have the ability to consistently form nanofibers, e.g., polyamide nanofibers, with acceptable fiber diameter distributions. Importantly, conventional processes do not provide the ability to tune, e.g., to adjust, control, or otherwise set properties and characteristics of the end product polyamide nanofiber nonwovens.

The inventors have now found that particular process parameters and conditions, e.g., moisture content of the polyamide, channel temperature, pressure of the pressurized gas, and/or presence of a catalyst, can be employed to effectively and consistently obtain specific desired properties and characteristics of the end product nonwoven. Beneficially, the tunable nature of the disclosed processes allow for a diversity of polyamide nanofiber nonwoven having desired, tuned characteristics. Further, the tunable nature of the disclosed processes, provides for added process flexibility and the ability to obtain tuned characteristics based on relationships of particular process parameters. Conventional processes did not contemplate these relationships, and, as such, were unable to provide the aforementioned tunability.

The present disclosure is directed, in part, to a tunable method for making a nanofiber nonwoven product and to the resultant products. The product is formed by spinning a polyamide composition into a plurality of nanofibers. The final product may be "tuned" by adjusting a variety of conditions during the spinning process, and/or by adjusting the (precursor) polyamide composition so as to achieve one or more desirable properties, such as average fiber diameter and Relative Viscosity (RV).

In some aspects, the average nanofiber diameter may be tuned by controlling a variety of conditions to a specific average nanofiber diameter. In some aspects, the specific average nanofiber diameter of the product may be controlled to be from 100 to 1000 nanometers (nm), e.g., from 110 to 950 nm, 150 to 950 nm, from 115 to 925 nm, from 120 to 900 nm, 150 to 900 nm, from 125 to 800 nm, from 150 to 800 nm, from 200 to 800 nm, from 125 to 700 nm, from 200 to 700 nm, from 130 to 600 nm, from 250 to 650 nm, from 300 to 550 nm or from 150 to 500 nm (additional average nanofiber diameter ranges and limits are provided herein).

In some aspects, the RV of the product may be tuned by controlling a variety of conditions to a specific RV. In some aspects, the specific RV of the product may be controlled to be from 2 to 330, e.g., from 2 to 300, from 2 to 275, from 2 to 250, from 2 to 225, from 2 to 200, 2 to 100, from 2 to 60, from 2 to 50, from 2 to 40, from 5 to 75, from 10 to 40, 15 to 50, from 15 to 40, from 20 to 40 or from 20 to 38 (additional RV ranges and limits are provided herein).

Conditions that may be adjusted during the spinning operation include, for example, channel temperature, air pressure, moisture content, and/or the presence of the catalyst. By adjusting at least one of these conditions, the RV of the product can be controlled, e.g., tuned to a specific average nanofiber diameter and/or specific RV. For example, the RV of the product may be controlled, e.g., the RV is increased, remains the same, or is decreased, relative to the RV of the polyamide composition.

The present disclosure is also directed, in part, to a method for tuning characteristics of a polyamide nanofiber nonwoven. The method comprises the step of targeting a specific average fiber diameter and/or a specific relative viscosity for the polyamide nanofiber nonwoven. The specific average nanofiber diameter may be within a range disclosed herein and/or the specific relative viscosity may be within a range disclosed herein. The method further comprises the steps of extruding a polyamide composition having a moisture content with a pressurized gas through a fiber forming channel having a channel temperature to form the polyamide nanofiber nonwoven having the target average nanofiber diameter and/or relative viscosity; and controlling the moisture content, the pressure of pressurized gas, and/or the channel temperature based on the specific average nanofiber diameter and/or the specific relative viscosity.

The present disclosure is also directed, in part, to a method for tuning the relative viscosity of a polyamide nanofiber nonwoven. The method comprises the step of targeting a specific relative viscosity for the polyamide nanofiber nonwoven. The specific relative viscosity may be within a range disclosed herein. The method further comprises the steps of extruding a polyamide composition having a moisture content to form the polyamide nanofiber nonwoven having the target relative viscosity, and controlling the moisture content based on the target relative viscosity.

The present disclosure is also directed, in part, to a method for tuning the nanofiber diameter of a polyamide nanofiber nonwoven. The method comprises the step of targeting a specific average nanofiber diameter. The specific average nanofiber diameter may be within a range from disclosed herein. The method further comprises the steps of extruding a polyamide composition with a pressurized gas to form the polyamide nanofiber nonwoven having the target average nanofiber diameter, and controlling the pressure of the pressurized gas based on the target average nanofiber diameter.

The present disclosure is also directed, in part, to polyamide nanofiber nonwoven products, and methods of preparing the products, where from 1 to 20% of the nanofiber diameters in the product are greater than 700 nanometers. The method to form such products includes providing a polyamide composition having an RV from 2 to 330, spinning the composition at temperatures in the range of 215° C. to 315° C. to form a plurality of nanofibers, and forming the nanofibers into the product, wherein the product has an average nanofiber diameter from 100 to 1000 nm, e.g., from 200 to 700 nm, and an RV from 2 to 330, e.g., from 5 to 75, from 15 to 50 or from 20 to 40.

The present disclosure is also directed, in part, to polyamide nanofiber nonwoven products formed by different spinning processes, wherein the selection of the equipment for the spinning process allows for one or more desired properties of the product to be achieved. Such desired properties include average nanofiber diameter, nanofiber diameter distribution, air permeability value, TDI, ODI, relative viscosity, filtration efficiency, and mean pore flow diameter. Additionally, the RV of the polyamide composition may optionally be adjusted, e.g., by changing the ratio of amine end groups to carboxylic acid end groups in the polyamide composition, to achieve the desired product property/properties.

The present disclosure is also directed, in part, to polyamide nanofiber nonwoven products, and methods of preparing the products, where a polyamide composition having an initial RV is provided for spinning, one or more desired properties for the product are chosen, the initial RV is adjusted based on at least one of the properties, the adjusted polyamide composition is spun into a plurality of nanofibers at a temperature, and the nanofibers are formed into the product, wherein the product has an average nanofiber diameter disclosed herein and an RV disclosed herein. The one or more desired properties may be average nanofiber diameter, nanofiber diameter distribution, air permeability value, TDI, ODI, relative viscosity, mean pore flow diameter, and filtration efficiency.

The polyamide composition, also referred to herein as a polyamide, may be spun or melt blown into fibers, e.g., nanofibers. The polyamide nanofibers may have an average diameter of less than 1000 nanometers (1 micron) and may be formed into the nonwoven product. Traditional melt spinning techniques have been unable to form fibers having low average diameters, e.g., nanofibers. Typical melt spun fiber average diameters are at least 1 micron and cannot achieve the surface area to volume ratio that a nanofiber can achieve. Such an increased surface area to volume ratio is beneficial in many applications.

Figure 2:
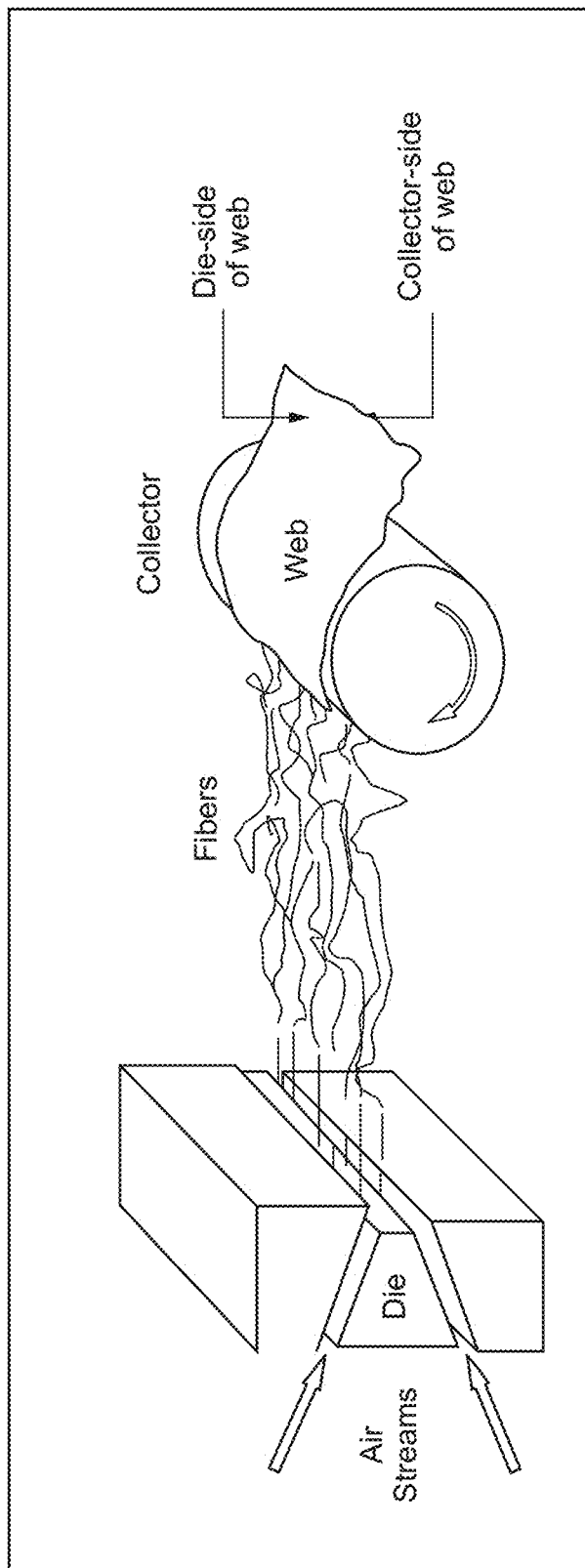

In some embodiments, the nanofiber nonwoven product is generally produced by: (a) providing a (spinnable) polyamide composition, wherein the polyamide composition has the RV discussed herein; (b) spinning the polyamide composition into a plurality of nanofibers having an average fiber diameter of less than 1 micron by way of a process directed to 2-phase propellant-gas spinning, including extruding the polyamide composition in liquid form with pressurized gas through a fiber-forming channel, and (c) forming the nanofibers into the nanofiber nonwoven product. The general process is illustrated in FIGS. 1 and 2.

The inventors have discovered that the characteristics of the precursor polyamide can be adjusted by utilizing particular parameters such that a desirable end product can be achieved. These specific relationships between polyamide composition, operating conditions, and end products have not yet been sufficiently explored and/or disclosed in the existing references.

Particularly preferred polyamides include nylon 66, as well as copolymers, blends, and alloys of nylon 66 with nylon 6.

Other embodiments include nylon derivatives, copolymers, terpolymers, blends and alloys containing or prepared from nylon 66 or nylon 6, copolymers or terpolymers with the repeat units noted above including but not limited to: N6T/66, N612, N6/66, N6I/66, N11, and N12, wherein "N" means Nylon, "T" means "terephthalic acid", and "I" means isophthalic acid. Another preferred embodiment includes High Temperature Nylons ("HTN") as well as blends, derivatives, copolymers or terpolymers containing them. Furthermore, another preferred embodiment includes long chain aliphatic polyamide made with long chain diacids as well as blends, derivatives or copolymers containing them.

FIG. 1 illustrates an exemplary technique wherein a 2 phase propellant gas spinning process may be used for making the nanofiber. FIG. 2 illustrates a general melt blowing technique.

In particular, disclosed herein is an embodiment wherein a method of making a nanofiber nonwoven product wherein the nonwoven fabric is melt-spun by way of melt-blowing through a spinneret into a high velocity gaseous stream. More particularly, in one embodiment, the nonwoven fabric is melt-spun by 2-phase propellant-gas spinning, including extruding the polyamide composition in liquid form with pressurized gas through a fiber-forming channel. Further embodiments disclose additional methods and equipment that may be used in the methods to form the desired product.

In one embodiment, the channel temperature of the fiber-forming channel may be controlled to tune a characteristics of the nanofiber nonwoven product. The fiber-forming channel may be a die and/or a capillary, and the channel temperature may be referred to as the die temperature. In one embodiment, the channel temperature may range from 270° C. to 330° C., e.g., from 275° C. to 320° C. or from 280° C. to 310° C.

Definitions and Test Methods

Terminology used herein is given its ordinary meaning consistent with the definitions set forth below; GSM refers to basis weight in grams per square meter (g/m$^2$), RV refers to Relative Viscosity and so forth.

Percentages, parts per million (ppm) and the like refer to weight percent or parts by weight based on the weight of the composition unless otherwise indicated.

Typical definitions and test methods are further recited in US Pub. Nos. 2015/0107457 and 2015/0111019. The term "nanofiber nonwoven product" for example, refers to a web of a multitude of essentially randomly oriented nanofibers where no overall repeating structure can be discerned by the naked eye in the arrangement of nanofibers. The nanofibers can be bonded to each other, or can be entangled and not bonded to impart strength and integrity to the web. The nanofibers can be staple nanofibers or continuous nanofibers, and can comprise a single material or a multitude of materials, either as a combination of different nanofibers or as a combination of similar nanofibers each comprising of different materials. The nanofiber nonwoven product is constructed predominantly of nanofibers. "Predominantly" means that greater than 50% of the fibers in the web are nanofibers. The term "nanofiber" refers to fibers having a number average diameter less than 1000 nm or 1 micron. In the case of nonround cross-sectional nanofibers, the term "diameter" as used herein refers to the greatest cross-sectional dimension.

Basis Weight may be determined by ASTM D-3776 and reported in g/m$^2$.

"Consisting essentially of" and like terminology refers to the recited components and excludes other ingredients which would substantially change the basic and novel characteristics of the composition or article. Unless otherwise indicated or readily apparent, a composition or article consists essentially of the recited or listed components when the composition or article includes 90% or more by weight of the recited or listed components. That is, the terminology excludes more than 10% unrecited components.

To the extent not indicated otherwise, test methods for determining average fiber diameters, are as indicated in Hassan et al., J of Membrane Sci., 427, 336-344, 2013, unless otherwise specified.

Air permeability is measured using an Air Permeability Tester, available from Precision Instrument Company, Hagerstown, MD. Air permeability is defined as the flow rate of air at 23±1° C. through a sheet of material under a specified pressure head. It is usually expressed as cubic feet per minute per square foot at 0.50 in. (12.7 mm) water pressure, in cm$^3$ per second per square cm or in units of elapsed time for a given volume per unit area of sheet. The instrument referred to above is capable of measuring permeability from 0 to approximately 5000 cubic feet per minute per square foot of test area. For purposes of comparing permeability, it is convenient to express values normalized to 5 GSM basis weight. This is done by measuring Air Permeability Value and basis weight of a sample (@ 0.5" H$_2$O typically), then multiplying the actual Air Permeability Value by the ratio of actual basis weight in GSM to 5. For example, if a sample of 15 GSM basis weight has a Value of 10 CFM/ft$^2$, its Normalized 5 GSM Air Permeability Value is 30 CFM/ft$^2$.

Polyamide

As used herein, polyamide composition and like terminology refers to compositions containing polyamides including copolymers, terpolymers, polymer blends, alloys and derivatives of polyamides. Further, as used herein, a "polyamide" refers to a polymer, having as a component, a polymer with the linkage of an amino group of one molecule and a carboxylic acid group of another molecule. In some aspects, the polyamide is the component present in the greatest amount. For example, a polyamide containing 40 wt. % nylon 6, 30 wt. % polyethylene, and 30 wt. % polypropylene is referred to herein as a polyamide since the nylon 6 component is present in the greatest amount. Additionally, a polyamide containing 20 wt. % nylon 6, 20 wt. % nylon 66, 30 wt. % polyethylene, and 30 wt. % polypropylene is also referred to herein as a polyamide since the nylon 6 and nylon 66 components, in total are the components present in the greatest amount.

Exemplary polyamides and polyamide compositions are described in Kirk-Othmer, Encyclopedia of Chemical Technology, Vol. 18, pp. 328371 (Wiley 1982), the disclosure of which is incorporated by reference.

Briefly, polyamides are generally known as compounds that contain recurring amide groups as integral parts of the main polymer chains. Linear polyamides are of particular interest and may be formed from condensation of bifunctional monomers. Polyamides are frequently referred to as nylons. Although they generally are considered as condensation polymers, polyamides also are formed by addition polymerization. This method of preparation is especially important for some polymers in which the monomers are cyclic lactams, e.g., Nylon 6. Particular polymers and copolymers and their preparation are seen in the following patents: U.S. Pat. Nos. 4,760,129; 5,504,185; 5,543,495; 5,698,658; 6,011,134; 6,136,947; 6,169,162; 7,138,482; 7,381,788; and 8,759,475.

There are numerous advantages of using polyamides, also known as specifically nylons, in commercial applications. Nylons are generally chemical and temperature resistant, resulting in superior performance to other particles. They are also known to have improved strength, elongation, and abrasion resistance as compared to other polymers. Nylons are also very versatile, allowing for their use in a variety of applications.

A class of polyamides particularly preferred for some applications includes High Temperature Nylons (HTN's) as are described in Glasscock et al., High Performance Polyamides Fulfill Demanding Requirements for Automotive Thermal Management Components, (DuPont), http://www2.dupont.com/Automotive/en_US/assets/downloads/knowledge%20center/HTN-whitepaper-R8.pdf available online Jun. 10, 2016. Such polyamides typically include one or more of the structures seen in the following:

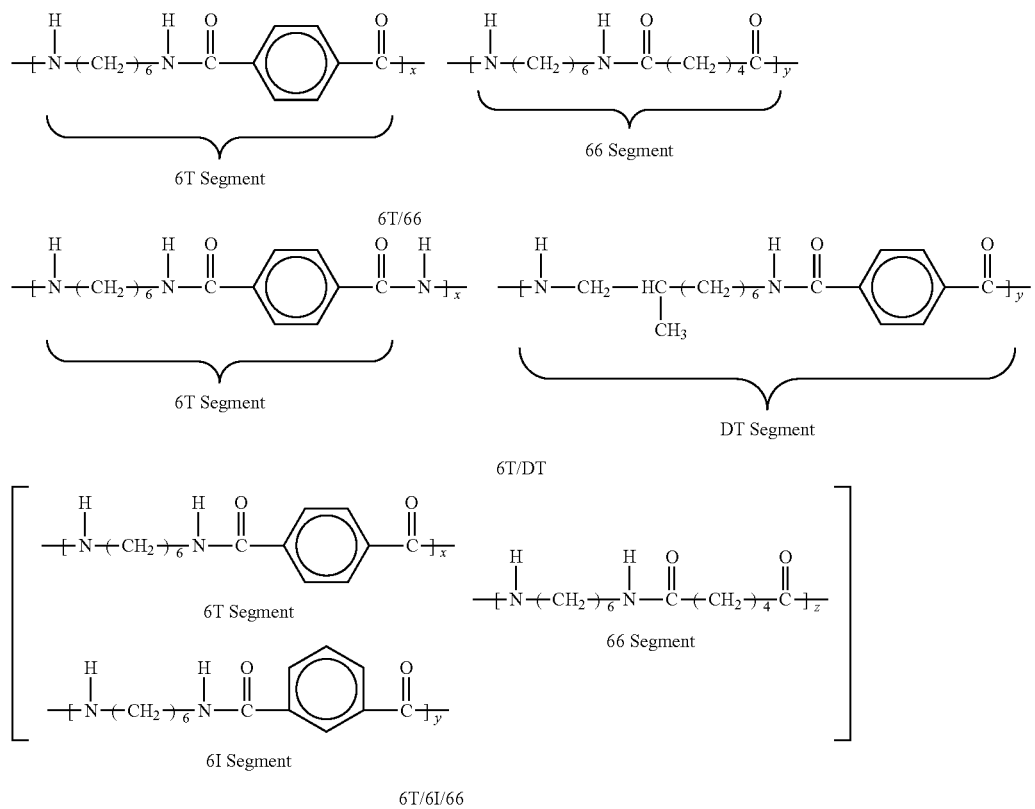

Non-limiting examples of polymers included in the polyamides include polyamides, polypropylene and copolymers, polyethylene and copolymers, polyesters, polystyrenes, polyurethanes, and combinations thereof. Thermoplastic polymers and biodegradable polymers are also suitable for melt blowing or melt spinning into nanofibers of the present invention. As discussed herein, the polymers may be melt spun or melt blown, with a preference for melt spinning or melt blowing by 2-phase propellant-gas spinning, including extruding the polyamide composition in liquid form with pressurized gas through a fiber-forming channel.

Melt points of nylon nanofiber products described herein, including copolymers and terpolymers, may be between 223° C. and 390° C., e.g., from 223° C. to 380° C., or from 225° C. to 350° C. Additionally, the melt point may be greater than that of conventional nylon 66 melt points depending on any additional polymer materials that are added.

Other polymer materials that can be used in the polyamide nanofiber nonwovens of the invention include both addition polymer and condensation polymer materials such as polyolefin, polyacetal, polyamide (as previously discussed), polyester, cellulose ether and ester, polyalkylene sulfide, polyarylene oxide, polysulfone, modified polysulfone polymers and mixtures thereof. Preferred materials that fall within these generic classes include polyamides, polyethylene, polybutylene terephthalate (PBT), polypropylene, poly(vinylchloride), polymethylmethacrylate (and other acrylic resins), polystyrene, and copolymers thereof (including ABA type block copolymers), poly(vinylidene fluoride), poly(vinylidene chloride), polyvinylalcohol in various degrees of hydrolysis (87% to 99.5%) in crosslinked and non-crosslinked forms. Addition polymers tend to be glassy (a Tg greater than room temperature). This is the case for polyvinylchloride and polymethylmethacrylate, polystyrene polymer compositions or alloys or low in crystallinity for polyvinylidene fluoride and polyvinylalcohol materials. Nylon copolymers embodied herein, can be made by combining various diamine compounds, various diacid compounds and various cyclic lactam structures in a reaction mixture and then forming the nylon with randomly positioned monomeric materials in a polyamide structure. For example, a nylon 66-6,10 material is a nylon manufactured from hexamethylene diamine and a C6 and a C10 blend of diacids. A nylon 6-66-6,10 is a nylon manufactured by copolymerization of epsilonaminocaproic acid, hexamethylene diamine and a blend of a C6 and a C10 diacid material.

In some embodiments, such as that described in U.S. Pat. No. 5,913,993, a small amount of polyethylene polymer can be blended with a nylon compound used to form a nanofiber nonwoven fabric with desirable characteristics. The addition of polyethylene to nylon enhances specific properties such as softness. The use of polyethylene also lowers cost of production, and eases further downstream processing such as bonding to other fabrics or itself. The improved fabric can be made by adding a small amount of polyethylene to the nylon feed material used in producing a nanofiber melt blown fabric. More specifically, the fabric can be produced by forming a blend of polyethylene and nylon 66, extruding the blend in the form of a plurality of continuous filaments, directing the filaments through a die to melt blow the filaments, depositing the filaments onto a collection surface such that a web is formed.

The polyethylene useful in the process of this embodiment of the subject invention preferably has a melt index between about 5 grams/10 min and about 200 grams/10 min and, more preferably, between about 17 grams/10 min and about 150 grams/10 min. The polyethylene should preferably have a density between about 0.85 grams/cc and about 1.1 grams/cc and, most preferably between about 0.93 grams/cc and about 0.95 grams/cc. Most preferably, the melt index of the polyethylene is about 150 and the density is about 0.93.

The polyethylene used in the process of this embodiment of the subject invention can be added at a concentration of about 0.05% to about 20%. In a preferred embodiment, the concentration of polyethylene will be between about 0.1% and about 1.2%. Most preferably, the polyethylene will be present at about 0.5%. The concentration of polyethylene in the fabric produced according to the method described will be approximately equal to the percentage of polyethylene added during the manufacturing process. Thus, the percentage of polyethylene in the fabrics of this embodiment of the subject invention will typically range from about 0.05% to about 20% and will preferably be about 0.5%. Therefore, the fabric will typically comprise between about 80 and about 99.95 wt. % of nylon. The filament extrusion step can be carried out between about 250° C. and about 325° C. Preferably, the temperature range is about 280° C. to about 315° C. but may be lower if nylon 6 is used.

The blend or copolymer of polyethylene and nylon can be formed in any suitable manner. Typically, the nylon compound will be nylon 66; however, other polyamides of the nylon family can be used. Also, mixtures of nylons can be used. In one specific example, polyethylene is blended with a mixture of nylon 6 and nylon 66. The polyethylene and nylon polymers are typically supplied in the form of pellets, chips, flakes, and the like. The desired amount of the polyethylene pellets or chips can be blended with the nylon pellets or chips in a suitable mixing device such as a rotary drum tumbler or the like, and the resulting blend can be introduced into the feed hopper of the conventional extruder or the melt blowing line. The blend or copolymer can also be produced by introducing the appropriate mixture into a continuous polymerization spinning system.

Further, differing species of a general polymeric genus can be blended. For example, a high molecular weight styrene material can be blended with a low molecular weight, high impact polystyrene. A Nylon-6 material can be blended with a nylon copolymer such as a Nylon-6; 66; 6,10 copolymer. Further, a polyvinylalcohol having a low degree of hydrolysis such as a 87% hydrolyzed polyvinylalcohol can be blended with a fully or superhydrolyzed polyvinylalcohol having a degree of hydrolysis between 98 and 99.9% and higher. All of these materials in admixture can be crosslinked using appropriate crosslinking mechanisms. Nylons can be crosslinked using crosslinking agents that are reactive with the nitrogen atom in the amide linkage. Polyvinyl alcohol materials can be crosslinked using hydroxyl reactive materials such as monoaldehydes, such as formaldehyde, ureas, melamine-formaldehyde resin and its analogues, boric acids and other inorganic compounds, dialdehydes, diacids, urethanes, epoxies and other known crosslinking agents. Crosslinking technology is a well-known and understood phenomenon in which a crosslinking reagent reacts and forms covalent bonds between polymer chains to substantially improve molecular weight, chemical resistance, overall strength and resistance to mechanical degradation.

One preferred mode of the invention is a polyamide comprising a first polymer and a second, but different polymer (differing in polymer type, molecular weight or physical property) that is conditioned or treated at elevated temperature. The polymer blend can be reacted and formed into a single chemical specie or can be physically combined into a blended composition by an annealing process. Annealing implies a physical change, like crystallinity, stress relaxation or orientation. Preferred materials are chemically reacted into a single polymeric specie such that a Differential Scanning Calorimeter (DSC) analysis reveals a single polymeric material to yield improved stability when contacted with high temperature, high humidity and difficult operating conditions. Preferred materials for use in the blended polymeric systems include nylon 6; nylon 66; nylon 6,10; nylon (6-66-6,10) copolymers and other linear generally aliphatic nylon compositions.

A suitable polyamide may include for example, 20% nylon 6, 60% nylon 66 and 20% by weight of a polyester. The polyamide may include combinations of miscible polymers or combinations of immiscible polymers.

In some aspects, the polyamide may include nylon 6. In terms of lower limits, the polyamide may include nylon 6 in an amount of at least 0.1 wt. %, e.g., at least 1 wt. %, at least 5 wt. %, at least 10 wt. %, at least 15 wt. %, or at least 20 wt. %. In terms of upper limits, the polyamide may include nylon 6 in an amount of 99.9 wt. % or less, 99 wt. % or less, 95 wt. % or less, 90 wt. % or less, 85 wt. % or less, or 80 wt. % or less. In terms of ranges, the polyamide may comprise nylon 6 in an amount from 0.1 to 99.9 wt. %, e.g., from 1 to 99 wt. %, from 5 to 95 wt. %, from 10 to 90 wt. %, from 15 to 85 wt. %, or from 20 to 80 wt. %.

In some aspects, the polyamide may include nylon 66. In terms of lower limits, the polyamide may include nylon 66 in an amount of at least 0.1 wt. %, e.g., at least 1 wt. %, at least 5 wt. %, at least 10 wt. %, at least 15 wt. %, or at least 20 wt. %. In terms of upper limits, the polyamide may include nylon 66 in an amount of 99.9 wt. % or less, 99 wt. % or less, 95 wt. % or less, 90 wt. % or less, 85 wt. % or less, or 80 wt. % or less. In terms of ranges, the polyamide may comprise nylon 66 in an amount from 0.1 to 99.9 wt. %, e.g., from 1 to 99 wt. %, from 5 to 95 wt. %, from 10 to 90 wt. %, from 15 to 85 wt. %, or from 20 to 80 wt. %.

In some aspects, the polyamide may include nylon 6I. In terms of lower limits, the polyamide may include nylon 6I in an amount of at least 0.1 wt. %, e.g., at least 0.5 wt. %, at least 1 wt. %, at least 5 wt. %, at least 7.5 wt. %, or at least 10 wt. %. In terms of upper limits, the polyamide may include nylon 6I in an amount of 50 wt. % or less, 40 wt. % or less, 35 wt. % or less, 30 wt. % or less, 25 wt. % or less, or 20 wt. % or less. In terms of ranges, the polyamide may comprise nylon 6I in an amount from 0.1 to 50 wt. %, e.g., from 0.5 to 40 wt. %, from 1 to 35 wt. %, from 5 to 30 wt. %, from 7.5 to 25 wt. %, or from 10 to 20 wt. %.

In some aspects, the polyamide may include nylon 6T. In terms of lower limits, the polyamide may include nylon 6T in an amount of at least 0.1 wt. %, e.g., at least 1 wt. %, at least 5 wt. %, at least 10 wt. %, at least 15 wt. %, or at least 20 wt. %. In terms of upper limits, the polyamide may include nylon 6T in an amount of 50 wt. % or less, 47.5 wt. % or less, 45 wt. % or less, 42.5 wt. % or less, 40 wt. % or less, or 37.5 wt. % or less. In terms of ranges, the polyamide may comprise nylon 6T in an amount from 0.1 to 50 wt. %, e.g., from 1 to 47.5 wt. %, from 5 to 45 wt. %, from 10 to 42.5 wt. %, from 15 to 40 wt. %, or from 20 to 37.5 wt. %.

Block copolymers are also useful in the process of this invention. With such copolymers the choice of solvent swelling agent is important. The selected solvent is such that both blocks were soluble in the solvent. One example is an ABA (styrene-EP-styrene) or AB (styrene-EP) polymer in methylene chloride solvent. If one component is not soluble in the solvent, it will form a gel. Examples of such block copolymers are Kraton® type of styrene-b-butadiene and styrene-b-hydrogenated butadiene (ethylene propylene), Pebax® type of e-caprolactam-b-ethylene oxide, Sympatex® polyester-b-ethylene oxide and polyurethanes of ethylene oxide and isocyanates.

Addition polymers like polyvinylidene fluoride, syndiotactic polystyrene, copolymer of vinylidene fluoride and hexafluoropropylene, polyvinyl alcohol, polyvinyl acetate, amorphous addition polymers, such as poly(acrylonitrile) and its copolymers with acrylic acid and methacrylates, polystyrene, poly(vinyl chloride) and its various copolymers, poly(methyl methacrylate) and its various copolymers, are known to be solution spun with relative ease because they are soluble at low pressures and temperatures. It is envisioned these can be melt spun per the instant invention as one method of making nanofibers.

There is a substantial advantage to forming polymeric compositions comprising two or more polymeric materials in polymer admixture, alloy format or in a crosslinked chemically bonded structure. We believe such polymer compositions improve physical properties by changing polymer attributes such as improving polymer chain flexibility or chain mobility, increasing overall molecular weight and providing reinforcement through the formation of networks of polymeric materials.

In one embodiment of this concept, two related polymer materials can be blended for beneficial properties. For example, a high molecular weight polyvinylchloride can be blended with a low molecular weight polyvinylchloride. Similarly, a high molecular weight nylon material can be blended with a low molecular weight nylon material.

RV and Fiber Diameter Targets

As explained above, channel temperature, pressure of the pressurized gas, moisture content, and/or the presence of a catalyst may be adjusted or controlled to adjust the nanofiber diameter and/or RV of the product to a targeted (specific) nanofiber diameter and/or RV.

RV

In some embodiments, the RV of the nonwoven may be tuned to a targeted (specific) RV. RV of polyamides refers to the ratio of solution or solvent viscosities measured in a capillary viscometer at 25° C. (ASTM D 789). For present purposes the solvent is formic acid containing 10 wt. % water and 90 wt. % formic acid. The solution is 8.4 wt. % polymer dissolved in the solvent.

In some embodiments, the targeted specific RV of the nanofiber nonwoven product has a lower limit of at least 2, e.g., at least 3, at least 4, at least 5, at least 10, at least 15, at least 20, or at least 25. In terms of upper limits, the nonwoven product may have an RV of 330 or less, 300 or less, 275 or less, 250 or less, 225 or less, 200 or less, 150 or less, 100 or less, 75 or less, 60 or less, 50 or less, 40 or less, or 38 or less. In terms of ranges, the nonwoven product may have an RV ranging from 2 to 330, e.g., from 2 to 300, from 2 to 275, from 2 to 250, from 2 to 225, from 2 to 200, 2 to 100, from 2 to 60, from 2 to 50, from 2 to 40, from 5 to 75, from 10 to 40, 15 to 50, from 15 to 40, from 20 to 40 or from 20 to 38, and any values in between.

The relationship between the RV of the polyamide composition and the RV of the nanofiber nonwoven product may vary. In some aspects, the RV of the nanofiber nonwoven product may be lower than the RV of the polyamide composition. Reducing the RV conventionally has not been a desirable practice when spinning nylon 66. The inventors, however, have discovered that, in the production of nanofibers, it is an advantage. It has been found that the use of lower RV polyamide nylons, e.g., lower RV nylon 66, in a melt spinning process has surprisingly been found to yield nanofiber filaments having unexpectedly small filament diameters.

In some embodiments, the RV of the polyamide, e.g., starting resin, has a lower limit of at least 2, e.g., at least 3, at least 4, or at least 5. In terms of upper limits, the polyamide has an RV of at 330 or less, 300 or less, 275 or less, 250 or less, 225 or less, 200 or less, 150 or less, 100 or less, or 60 or less. In terms of ranges, the polyamide may have an RV of 2 to 330, e.g., from 2 to 300, from 2 to 275, from 2 to 250, from 2 to 225, from 2 to 200, 2 to 100, from 2 to 60, from 2 to 50, from 2 to 40, from 10 to 40, or from 15 to 40 and any values in between.

In some aspects, the RV of the nanofiber nonwoven product is at least 20% less than the RV of the polyamide prior to spinning, e.g., at least 25% less, at least 30% less, at least 35% less, at least 40% less, at least 45% less, or at least 90% less.

In other aspects, the RV of the nanofiber nonwoven product is at least 5% greater than the RV of the polyamide prior to spinning, e.g., at least 10% greater, at least 15% greater, at least 20% greater, at least 25% greater, at least 30% greater, or at least 35% greater.

In still further aspects, the RV of the polyamide and the RV of the nanofiber nonwoven product may be substantially the same, e.g., within 5% of each other.

The RV, ($\eta r$), is the ratio of the absolute viscosity of the polymer solution to that of the formic acid:
$\eta_r = (\eta_p/\eta_f) = (f_r \times d_p \times t_p)/\eta_f$, where: $d_p$=density of formic acid-polymer solution at 25° C.,
$t_p$=average efflux time for formic acid-polymer solution, $\eta_f$=absolute viscosity of formic acid, kPa×s(E+6cP) and $f_r$=viscometer tube factor, mm$^2$/s (cSt)/s=$\eta_r/t_3$.

A typical calculation for a 50 RV specimen:
$\eta r = (fr \times dp \times tp)/\eta f$, where:
fr=viscometer tube factor, typically 0.485675 cSt/s
dp=density of the polymer—formic solution, typically 1.1900 g/ml
tp=average efflux time for polymer—formic solution, typically 135.00 s
$\eta f$=absolute viscosity of formic acid, typically 1.56 cP
giving an RV of $\eta r$=(0.485675 cSt/s×1.1900 g/ml×135.00 s)/1.56 cP=50.0. The term $t_3$ is the efflux time of the S-3 calibration oil used in the determination of the absolute viscosity of the formic acid as required in ASTM D789 (2015).

Fiber Diameter, Distributions, Equipment

In some embodiments, the average fiber diameter of the nonwoven may be tuned to a targeted (specific) average fiber diameter. The fibers (of the nonwovens) disclosed herein may be nanofibers, e.g., fibers having an average fiber diameter of less than or equal to 1000 nm. Although the present disclosure is generally directed to nanofibers, the tunable aspects of the present disclosure are applicable to fibers having greater fiber diameters, e.g., fiber diameters of 1000 nm or greater.

In one embodiment, the targeted specific average nanofiber diameter is less than or equal to 1000 nm, e.g., less than or equal to 950 nm, less than or equal to 925 nm, less than or equal to 900 nm, less than or equal to 800 nm, less than or equal to 700 nm, less than or equal to 600 nm, or less than or equal to 500 nm. In terms of lower limits, the specific average nanofiber diameter may be at least 100 nm, at least 110 nm, at least 115 nm, at least 120 nm, at least 125 nm, at least 130 nm, at least 150 nm, at least 200 nm, at least 250 nm or at least 300 nm. In terms of ranges, the specific average nanofiber diameter range from 100 to 1000 nm, e.g., from 110 to 950 nm, 150 to 950 nm, from 115 to 925 nm, from 120 to 900 nm, 150 to 900 nm, from 125 to 800 nm, from 300 to 850 nm, from 150 to 800 nm, from 200 to 800 nm, from 125 to 700 nm, from 200 to 700 nm, from 350 to 700 nm, from 400 to 700 nm, from 130 to 600 nm, from 250 to 650 nm, from 300 to 550 nm or from 150 to 500 nm. Such average nanofiber diameters differentiate the nanofibers formed by the spinning processes disclosed herein from nanofibers formed by electrospinning processes. Electrospinning processes typically produce nonwovens having average fiber diameters that are smaller than melt-blown processes. The size of nanofibers produced by electrospinning may vary, and includes fiber diameters of less than 100 nm, e.g., from 50 to less than 100 nm. Without being bound by theory, it is believed that such small nanofiber diameters may result in reduced strength of the fibers and increased difficulty in handling the nanofibers.

The use of the disclosed process and precursors leads to a specific and beneficial distribution of fiber diameters. For example, less than 20% of the nanofibers may have a fiber diameter from greater than 700 nm, e.g., less than 17.5%, less than 15%, less than 12.5%, or less than 10%. In terms of lower limits, at least 1% of the nanofibers have a fiber diameter of greater than 700 nanometers, e.g., at least 2%, at least 3%, at least 4%, or at least 5%. In terms of ranges, from 1 to 20% of the nanofibers have a fiber diameter of greater than 700 nanometers, e.g., from 2 to 17.5%, from 3 to 15%, from 4 to 12.5%, or from 5 to 10%. Such a distribution differentiates the nanofiber nonwoven products described herein from those formed by electrospinning (which have a smaller average diameter and a much narrower distribution) and from those formed by non-nanofiber melt spinning (which have a much greater distribution). For example, a non-nanofiber centrifugally spun nonwoven is disclosed in WO 2017/214085 and reports fiber diameters of 2.08 to 4.4 microns but with a very broad distribution reported in FIG. 10A of WO 2017/214085.

The product having the nanofiber distribution described herein may be formed by providing a polyamide composition having a RV from 2 to 330, spinning the polyamide composition at a channel temperature in the range disclosed herein to form a plurality of nanofibers, and forming the nanofibers into the nanofiber nonwoven product, wherein the product has a specific average nanofiber diameter disclosed herein, and/or a specific RV disclosed herein, and from 1 to 20% of nanofibers having a diameter of greater than 700 nanometers, including further ranges and limits disclosed herein. During the production of the nanofibers, it has surprisingly and unexpectedly been found that the nanofiber diameter distribution and the average nanofiber diameter do not substantially change when the throughput of the polyamide composition through the spinning process is changed. For example, changing the throughput rate through a die or capillary does not substantially change the nanofiber distribution or average diameter, e.g., a change of less than 10% is seen, less than 5%, less than 1%, or less than 0.5%. Thus lack of response to a change in throughput is advantageous because it allows for the adjustment of other product features, such as basis weight, without also having to account for changes in average diameter or nanofiber diameter distribution.

Without being bound by theory, it is believed that other changes to the method do allow for the average nanofiber diameter and/or the nanofiber diameter distribution to be adjusted. In some aspects, the number of holes per inch in the die or capillary is adjusted. In some aspects, the size of the holes in the die or capillary is adjusted. In still further aspects, the holdup time in the spinning process may be adjusted. In some aspects, the flow characteristics of the polyamide composition through the die or capillary may be adjusted. In some aspects, nylon 6 or other polyamides may be added to the polyamide composition. Additionally, further modifications in the equipment used may influence the average nanofiber diameter and/or the nanofiber diameter distribution. Equipment such as that described in U.S. Pat. Nos. 7,300,272; 8,668,854; and 8,658,067, the entireties of which are incorporated by reference herein, may be used. Briefly, U.S. Pat. No. 7,300,272 discloses equipment comprising a fiber extrusion pack including a number of split distribution plates arranged in a stack to form a distribution network. U.S. Pat. No. 8,668,854 discloses a two-phase flow nozzle and a converging channel, wherein the converging channel accelerates the polyamide composition from the two-phase flow nozzle to a channel exit to form a polymeric film along the surface of the converging channel, wherein the polymeric film is fibrillated at the channel exit to form the nanofibers; and collecting the nanofibers to form the product. U.S. Pat. No. 8,658,067 discloses a fiber producing device comprising a body configured to receive the polyamide composition, a driver capable of rotating the body, a deposition system for directing nanofibers formed in the body toward a substrate, and a substrate transfer system for moving substrate material through a deposition system for directing the nanofibers to the substrate. In yet another aspect, in the melt blown process the orientation of the air relative to the exit of the polymer from the capillaries in the die may be modified.

An additional embodiment of the present invention involves production of a layer of filter media comprising polyamide nanofibers having the specific average fiber diameter and/or having the specific RV disclosed herein. In this alternate embodiment, some RV ranges include: 2 to 330, e.g., from 2 to 300, from 2 to 275, from 2 to 250, from 2 to 225, from 2 to 200, 2 to 100, from 2 to 60, from 2 to 50, from 2 to 40, from 10 to 40, or from 15 to 40. The nanofibers are subsequently converted to nonwoven web. As the RV increases beyond about 20 to 30, operating temperature becomes a greater parameter to consider. At an RV above the range of about 20 to 30, the temperature must be carefully controlled so as the polymer melts for processing purposes. Methods or examples of melt techniques are described in U.S. Pat. No. 8,777,599, as well as heating and cooling sources which may be used in the apparatuses to independently control the temperature of the fiber producing device. Non limiting examples include resistance heaters, radiant heaters, cold gas or heated gas (air or nitrogen), or conductive, convective, or radiation heat transfer mechanisms.

Moisture Content, Temperature, Pressure, End Groups, Catalyst, and Tunability

As noted above, the targeted (specific) nanofiber diameter and/or RV may be tuned by adjusting or controlling the disclosed parameters, e.g., channel temperature, pressure of the pressurized gas, moisture content, and/or the presence of a catalyst.

Moisture Content

The inventors have discovered that, beneficially, the RV of the polyamide, e.g., the nylon 66, may be tuned, e.g., lowered, by depolymerizing the polymer with the addition of moisture. Up to 3% moisture, e.g., from 0.0005 to 3 wt. %, from 0.005 to 1 wt. %, from 0.005 to 0.5 wt. %, may be included before the polyamide begins to hydrolyze. This technique provides a surprising advantage over the conventional method of adding other polymers, e.g., polypropylene, to the polyamide. As discussed further herein, the moisture content may also be adjusted (optionally in combination with adjusting the ratio of the end groups) to keep the reaction equilibrium constant the same.

In some aspects, the RV of the nonwoven product may be tuned, e.g., by lowering the temperature and/or by reducing the moisture content of the polyamide composition, e.g., starting resin. In some cases, temperature may have a relatively modest effect on adjusting the RV, as compared to moisture content of the polyamide composition.

The moisture may be adjusted within the range of 0.0005 to 3 wt. %., e.g., from 0.005 to 1 wt. %, from 0.005 to 0.5 wt. %, or from 0.02 to 0.3 wt. %, and all ranges within, as described herein. In some aspects, the moisture content may be raised within this range to lower the RV of the product relative to the RV of the polyamide composition. In some aspects, the moisture content may be lowered within this range to raise the RV of the product relative to the RV of the polyamide composition.

In some embodiments, the moisture content of the polyamide composition may be tuned to achieve the desired end product nonwoven characteristic(s). For example the moisture content may be controlled to have a lower value that is greater than or equal to 0.0001 wt. %, e.g., greater than or equal to 0.0005 wt. %, greater than or equal to 0.001 wt. %, greater than or equal to 0.005 wt. %, greater than or equal to 0.01 wt. %, greater than or equal to 0.02 wt. %, greater than or equal to 0.05 wt. %, greater than or equal to 0.1 wt. %, or greater than or equal to 0.25 wt. %. In some aspects, up to 5 wt. % moisture, e.g., up to 4 wt. %, up to 3 wt. %, up to 2 wt. %, up to 1 wt. %, up to 0.75 wt. %, up to 0.5 wt. %, up to 0.4 wt. %, or up to 0.3 wt. %. may be included before the polyamide begins to hydrolyze. In terms of ranges, the moisture content may range from 0.0005 to 5 wt. %, e.g., from 0.001 to 4 wt. %, from 0.01 to 3 wt. %, from 0.25 to 2 wt. %, from 0.25 to 1 wt. %, from 0.25 to 0.6 wt. %, from 0.005 to 1 wt. %, from 0.005 to 0.5 wt. %, from 0.02 to 0.3 wt. % or from 0.1 to 0.3 wt. %. Reduction of moisture content is also advantageous for decreasing TDI and ODI values, as discussed further herein.

The moisture content may be adjusted by selecting a polyamide composition with the desired moisture content. Commercially available polyamide compositions may have a moisture content that ranges from 0.25 to 0.6 wt. %.

In one embodiment, the moisture content may be adjusted by drying the polyamide composition to essentially dry, or having a moisture content of less than 0.02 wt. %, e.g., less than 0.001 wt. %, less than 0.0005 wt. %, or less than 0.0001 wt. %.

To control the moisture content, the polyamide composition may be rehydrated to the desired moisture content. This may be done prior to feeding the polyamide to the extruder. In one embodiment, the moisture adjustment may be done during extrusion.

Channel Temperature

The inventors have discovered that process temperatures, such as channel temperature, may be tuned (optionally in combination with other parameters) to achieve the targeted (specific) nanofiber diameter and/or RV.

In one embodiment, process temperature, such as channel temperature, may be raised to lower the RV. In some embodiments, however, a process temperature raise may only slightly lower the RV since temperature affects the kinetics of the reaction, but not the reaction equilibrium constant.

In some embodiments, the moisture content of the polyamide composition may be tuned to achieve the desired end product nonwoven characteristic(s). For example the moisture content may be controlled to have a lower value that is greater 0.02 wt. %.

In one embodiment, the channel temperature (or die temperature) may be tuned to achieve the desired end product nonwoven characteristic(s). For example, channel temperature may be controlled to be within the range from 215° C. to 330° C., e.g., from 250° C. to 330° C., from 270° C. to 325° C., from 250° C. to 315° C., from 270° C. to 315° C., from 215° C. to 315° C., from 225° C. to 300° C., from 235° C. to 290° C., or from 250° C. to 280° C. In some aspects, the channel temperature has a lower limit of 215° C., e.g., 225° C., 235° C., 250° C. or 270° C. In some aspects, the channel temperature has an upper limit of 330° C., e.g., 325° C., 320° C., 315° C., 300° C., 290° C., or 280° C. In some aspects, the temperature may be raised within these ranges and limits to lower the RV of the product relative to the RV of the polyamide composition. In some aspects, the temperature may be lowered within these ranges and limits to raise the RV of the product relative to the RV of the polyamide composition.

Pressure

It has also been found that process pressures, such as the pressure of the pressurized gas used to extrude (spin) the polyamide into the nonwoven, may be tuned (optionally in combination with other parameters) to achieve the targeted (specific) nanofiber diameter and/or RV.

In one embodiment, the pressure may be tuned to achieve the desired end product nonwoven characteristic(s). For example, pressure may be controlled to range from 150 kPa to 250 kPa, e.g., from 150 kPa to 240 kPa, from 160 kPa to 220 kPa, from 170 kPa to 230 kPa, from 180 kPa to 220 kPa, from 180 kPa to 215 kPa, from 190 kPa to 210 kPa, or from 182 kPa to 218 kPa. In terms of lower limits, the pressure may be greater than 150 kPa, e.g., greater than 160 kPa, greater than 170 kPa, greater than 180 kPa, greater than 182 kPa, or greater than 190 kPa. In terms of upper limits, the pressure may be less than 250 kPa, e.g., less than 240 kPa, less than 230 kPa, less than 220 kPa, less than 218 kPa, less than 215 kPa, or less than 210 kPa.

End Groups

In some aspects, the tunable aspect of the present disclosure allows for modifications to the polyamide composition in order to affect the properties and/or characteristics of the resultant nanofibers and/or nonwoven product. For example, the polyamide composition may be modified, during or subsequent to polymerization, to modify the ratio of amine end groups to carboxylic acid end groups. Such a modification may result in unbalanced end groups. The ratio of diamine end groups to carboxylic acid end groups may be adjusted within the range of 100:1 to 1:100, e.g., 95:1 to 1:95, 75:1 to 1:75, 50:50, and all values in between. Without being bound by theory, it is believed that by having unbalanced end groups, e.g., modifying the ratio of the end groups, the ability to form acceptable products from a relatively low RV polyamide composition may be improved. Such a relatively low RV polyamide composition may have an RV from 2 to 30, e.g., from 2 to 25, from 2 to 20, from 2 to 15, or from 2 to 10.

In an embodiment of the invention, advantages are envisioned having two related polymers with different RV values (both less than 330 and having the ability to form nanofibers with an average fiber diameter less than 1 micron) blended for a desired property. For example, the melting point of the polyamide may be increased, the RV adjusted, or other properties adjusted.

Catalyst

In some cases, a catalyst may be added in order to increase the reaction rate. The inclusion of a catalyst may affect the reaction kinetics, but not the actual K value (reaction equilibrium constant value). Exemplary catalysts include benzene phosphinic acid, benzene phosphonic acid, sodium hypophosite, hypophosphorus acid, monosodium phosphate, phosphoric acid, or combinations thereof. Without being bound by theory, it is postulated that the catalyst may be added to increase the reaction rate, achieving the desired RV and reducing the residence time in the spinning system. Such results may be advantageous by allowing the use of lower cost equipment to achieve a desired RV that is greater than the initial polyamide composition.

Other Components

In some embodiments, the resultant nanofibers contain small amounts, if any, of solvent. Accordingly, in some aspects, the resultant nanofibers are free of solvent. The use of the melt spinning process advantageously reduces or eliminates the need for solvents. This reduction/elimination leads to beneficial effects such as environmental friendliness and reduced costs. Fibers formed via solution spinning processes, which are entirely different from melt spinning processes described herein, require such solvents. In one embodiment, the polyamide nanofiber nonwoven is melt-blown and/or is free of solvent. In some embodiments, the nanofibers comprise less than 1 wt. % solvent, less than 5000 ppm, less than 2500 ppm, less than 2000 ppm, less than 1500 ppm, less than 1000 ppm, less than 500 ppm, less than 400 ppm, less than 300 ppm, less than 200 ppm, less than 100 ppm, or less than a detectable amount of solvent including zero. Solvents may vary depending on the components of the polyamide but may include formic acid, sulfuric acid, toluene, benzene, chlorobenzene, xylene/chlorohexanone, decalin, paraffin oil, ortho dichlorobenzene, and other known solvents. In terms of ranges, when small amounts of solvent are included, the resultant nanofibers may have at least 1 ppm, at least 5 ppm, at least 10 ppm, at least 15 ppm, or at least 20 ppm solvent. In some aspects, non-volatile solvents, such as formic acid, may remain in the product and may require an additional extraction step. Such an additional extraction step may add to production costs. In some aspects, the amount of solvent included, if any, may be adjusted to affect the RV of the polyamide composition and/or the RV of the product In other embodiments, the nanofibers may be entangled with a scrim without the use of adhesives. Accordingly, the nanofibers contain no adhesives.

In some cases, the nanofiber may be made of a polyamide material that optionally includes an additive. Examples of suitable additives include oils (such as finishing oils, e.g., silicone oils), waxes, solvents (including formic acid as described herein), lubricants (e.g., paraffin oils, amide waxes, and stearates), stabilizers (e.g., photostabilizers, UV stabilizers, etc.), delusterants, antioxidants, colorants, pigments, and dyes. The additives may be present in a total amount of up to 49 wt. % of the nanofiber nonwoven product, e.g., up to 40 wt. %, up to 30 wt. %, up to 20 wt. %, up to 10 wt. %, up to 5 wt. %, up to 3 wt. %, or up to 1 wt. %. In terms of lower limits, the additives may be present in the nanofiber product in an amount of at least 0.01 wt. %, e.g., at least 0.05 wt. %, at least 0.1 wt. %, at least 0.25 wt. %, or at least 0.5 wt. %. In terms of ranges, the additives may be present in the nanofiber product in an amount from 0.01 to 49 wt. %, e.g., from 0.05 to 40 wt. %, from 0.1 to 30 wt. %, from 0.25 to 20 wt. %, from 0.5 to 10 wt. %, from 0.5 to 5 wt. %, or from 0.5 to 1 wt. %. In some aspects, monomers and/or polymers may be included as additives. For example, nylon 6I and/or nylon 6T may be added as an additive. In some aspects, the presence and/or amount of additive included may be adjusted to modify the RV of the polyamide composition and/or the product.

Antioxidants suitable for use in conjunction with the nanofiber nonwoven product described herein may, in some embodiments, include, but are not limited to, anthocyanin, ascorbic acid, glutathione, lipoic acid, uric acid, resveratrol, flavonoids, carotenes (e.g., beta-carotene), carotenoids, tocopherols (e.g., alpha-tocopherol, beta-tocopherol, gamma-tocopherol, and delta-tocopherol), tocotrienols, ubiquinol, gallic acids, melatonin, secondary aromatic amines, benzofuranones, hindered phenols, polyphenols, hindered amines, organophosphorus compounds, thioesters, benzoates, lactones, hydroxylamines, and the like, and any combination thereof. In some embodiments, the antioxidant may be selected from the group consisting of stearyl 3-(3,5-di-tert-butyl-4-hydroxyphenyl) propionate, bis(2,4-dicumylphenyl)pentaerythritol diphosphite, tris(2,4-di-tert-butylphenyl)phosphite, bisphenol A propoxylate diglycidyl ether, 9,10-dihydroxy-9-oxa-10-phosphaphenanthrene-10-oxide and mixtures thereof.

Colorants, pigments, and dyes suitable for use in conjunction with the nanofiber nonwoven product described herein may, in some embodiments, include, but are not limited to, plant dyes, vegetable dyes, titanium dioxide (which may also act as a delusterant), carbon black, charcoal, silicon dioxide, tartrazine, E102, phthalocyanine blue, phthalocyanine green, quinacridones, perylene tetracarboxylic acid di-imides, dioxazines, perinones disazo pigments, anthraquinone pigments, metal powders, iron oxide, ultramarine, nickel titanate, benzimidazolone orange gl, solvent orange 60, orange dyes, calcium carbonate, kaolin clay, aluminum hydroxide, barium sulfate, zinc oxide, aluminum oxide, CARTASOL® dyes (cationic dyes, available from Clariant Services) in liquid and/or granular form (e.g., CARTASOL Brilliant Yellow K-6G liquid, CARTASOL Yellow K-4GL liquid, CARTASOL Yellow K-GL liquid, CARTASOL Orange K-3GL liquid, CARTASOL Scarlet K-2GL liquid, CARTASOL Red K-3BN liquid, CARTASOL Blue K-5R liquid, CARTASOL Blue K-RL liquid, CARTASOL Turquoise K-RL liquid/granules, CARTASOL Brown K-BL liquid), FASTUSOL® dyes (an auxochrome, available from BASF) (e.g., Yellow 3GL, Fastusol C Blue 74L), and the like, any derivative thereof, and any combination thereof. In some embodiments, solvent dyes may be employed.

Method of Forming the Nanofibers

As described herein, the nanofiber nonwoven product is formed by spinning or melt blowing to form a spun product. Spinning, as used herein, refers to the steps of melting a polyamide composition and forming the polyamide composition into fibers. Examples of spinning include centrifugal spinning, melt blowing, spinning through a spinneret (e.g., a spinneret without a charge) or die, and "island-in-the sea" geometry. "Island-in-the-sea" refers to fibers forming by extruding at least two polymer components from one spinning die, also referred to as conjugate or bicomponent spinning. As used herein, spinning specifically excludes solution spinning and electrospinning.

In some aspects, the polyamide nanofiber is melt blown. Melt blowing is advantageously less expensive than electrospinning. Melt blowing is a process type developed for the formation of nanofibers and nonwoven webs; the nanofibers are formed by extruding a molten thermoplastic polymeric material, or polyamide, through a plurality of small holes. The resulting molten threads or filaments pass into converging high velocity gas streams which attenuate or draw the filaments of molten polyamide to reduce their diameters. Thereafter, the melt blown nanofibers are carried by the high velocity gas stream and deposited on a collecting surface, or forming wire, to form a nonwoven web of randomly disbursed melt blown nanofibers. The formation of nanofibers and nonwoven webs by melt blowing is well known in the art. See, by way of example, U.S. Pat. Nos. 3,016,599; 3,704,198; 3,755,527; 3,849,241; 3,978,185; 4,100,324; 4,118,531; and 4,663,220.

An embodiment of making the inventive nanofiber nonwovens is by way of 2-phase spinning or melt blowing with propellant gas through a spinning channel as is described generally in U.S. Pat. No. 8,668,854. This process includes two phase flow of polymer or polymer solution and a pressurized propellant gas (typically air) to a thin, preferably converging channel. The channel is usually and preferably annular in configuration. It is believed that the polymer is sheared by gas flow within the thin, preferably converging channel, creating polymeric film layers on both sides of the channel. These polymeric film layers are further sheared into nanofibers by the propellant gas flow. Here again, a moving collector belt may be used and the basis weight of the nanofiber nonwoven is controlled by regulating the speed of the belt. The distance of the collector may also be used to control fineness of the nanofiber nonwoven. The process is better understood with reference to FIG. 1.

Additional methods and the associated equipment are disclosed in U.S. Pat. Nos. 7,300,272; 8,668,854; and 8,658,067, described herein. Depending on the desired properties of the product, the equipment may be chosen accordingly. For example, such properties include RV, average nanofiber diameter, nanofiber diameter distribution, air permeability value, TDI, and ODI. Each property and the desirable ranges for each property are discussed further herein. In addition to adjusting the equipment used in the spinning process, the RV of the polyamide composition may also optionally be adjusted. The RV of the polyamide composition may be adjusted to achieve one of the properties described above. The equipment and RV may be selected to achieve the same property or they may independently be selected to achieve different properties. For example, the residence time and heat transfer of equipment may be adjusted to reduce the ODI and TDI of the nanofiber fabric. Different melt spinning equipment may also have different optimal RV ranges that impacts the capability to achieve the desired targeted properties of the nanofiber fabric. Beneficially, the use of the aforementioned polyamide composition in the melt spinning process provides for significant benefits in production rate, e.g., at least 5% greater, at least 10% greater, at least 20% greater, at least 30% greater, at least 40% greater.

FIG. 1 illustrates schematically operation of a system for spinning a nanofiber nonwoven including a polyamide feed assembly 110, an air feed 1210 a spinning cylinder 130, a collector belt 140 and a take up reel 150. During operation, polyamide melt or solution is fed to spinning cylinder 130 where it flows through a thin channel in the cylinder with high pressure air, shearing the polyamide into nanofibers. Details are provided in the aforementioned U.S. Pat. No. 8,668,854. The throughput rate and basis weight is controlled by the speed of the belt. Optionally, functional additives such as charcoals, copper or the like can be added with the air feed, if so desired.

In an alternate construction of the spinneret used in the system of FIG. 1, particulate material may be added with a separate inlet as is seen in U.S. Pat. No. 8,808,594.

Still yet another methodology which may be employed is melt blowing the polyamide nanofiber webs of the invention (FIG. 2). Melt blowing involves extruding the polyamide into a relatively high velocity, typically hot, gas stream. To produce suitable nanofibers, careful selection of the orifice and capillary geometry as well as the temperature is required as is seen in: Hassan et al., J Membrane Sci., 427, 336-344, 2013 and Ellison et al., Polymer, 48 (11), 3306-3316, 2007, and, International Nonwoven Journal, Summer 2003, pg 21-28.

U.S. Pat. No. 7,300,272 discloses a fiber extrusion pack for extruding molten material to form an array of nanofibers that includes a number of split distribution plates arranged in a stack such that each split distribution plate forms a layer within the fiber extrusion pack, and features on the split distribution plates form a distribution network that delivers the molten material to orifices in the fiber extrusion pack. Each of the split distribution plates includes a set of plate segments with a gap disposed between adjacent plate segments. Adjacent edges of the plate segments are shaped to form reservoirs along the gap, and sealing plugs are disposed in the reservoirs to prevent the molten material from leaking from the gaps. The sealing plugs can be formed by the molten material that leaks into the gap and collects and solidifies in the reservoirs or by placing a plugging material in the reservoirs at pack assembly. This pack can be used to make nanofibers with a melt blowing system described in the patents previously mentioned.

The spinning processes described herein can form a polyamide nanofiber nonwoven product having a relatively low oxidative degradation index ("ODI") value. A lower ODI indicates less severe oxidative degradation during manufacture. In some aspects, the ODI may range from 10 to 150 ppm. ODI may be measured using gel permeation chromatography (GPC) with a fluorescence detector. The instrument is calibrated with a quinine external standard. 0.1 grams of nylon is dissolved in 10 mL of 90% formic acid. The solution is then analyzed by GPC with the fluorescence detector. The detector wavelengths for ODI are 340 nm for excitation and 415 nm for emission. In terms of upper limits, the ODI of the polyamide nanofiber nonwoven may be 200 ppm or less, e.g., 180 ppm or less, 150 ppm or less, 125 ppm or less, 100 ppm or less, 75 ppm or less, 60 ppm or less, or 50 ppm or less. In terms of the lower limits, the ODI of the polyamide nanofiber nonwoven may be 1 ppm or greater, 5 ppm or greater, 10 ppm or greater, 15 ppm or greater, 20 ppm or greater, or 25 ppm or greater. In terms of ranges, the ODI of the polyamide nanofiber nonwoven may be from 1 to 200 ppm, from 1 to 180 ppm, from 1 to 150 ppm, from 5 to 125 ppm, from 10 to 100 ppm, from 1 to 75 ppm, from 5 to 60 ppm, or from 5 to 50 ppm.

Additionally, the spinning processes as described herein can result in a relatively low thermal degradation index ("TDI"). A lower TDI indicates a less severe thermal history of the polyamide during manufacture. TDI is measured the same as ODI, except that the detector wavelengths for TDI are 300 nm for excitation and 338 nm for emission. In terms of upper limits, the TDI of the polyamide nanofiber nonwoven may be 4000 ppm or less, e.g., 3500 ppm or less, 3100 ppm or less, 2500 ppm or less, 2000 ppm or less, 1000 ppm or less, 750 ppm or less, or 700 ppm or less. In terms of the lower limits, the TDI of the polyamide nanofiber nonwoven may be 20 ppm or greater, 100 ppm or greater, 125 ppm or greater, 150 ppm or greater, 175 ppm or greater, 200 ppm or greater, or 210 ppm or greater. In terms of ranges, the TDI of the polyamide nanofiber nonwoven may be from 20 to 4000 ppm, 100 to 4000 ppm, from 125 to 3500 ppm, from 150 to 3100 ppm, from 175 to 2500 ppm, from 200 to 2000 ppm, from 210 to 1000 ppm, from 200 to 750 ppm, or from 200 to 700 ppm.

TDI and ODI test methods are also disclosed in U.S. Pat. No. 5,411,710. Lower TDI and/or ODI values are beneficial because they indicate that the nanofiber nonwoven product is more durable than products having greater TDI and/or ODI. As explained above, TDI and ODI are measures of degradation and a product with greater degradation would not perform as well. For example, such a product may have reduced dye uptake, lower heat stability, lower life in a filtration application where the fibers are exposed to heat, pressure, oxygen, or any combination of these, and lower tenacity in industrial fiber applications. Although a low TDI and/or ODI may be preferable, the TDI and/or ODI values may be balanced with other desirable properties disclosed herein, including average nanofiber diameter, nanofiber diameter distribution, air permeability value, relative viscosity, mean pore flow diameter, and filtration efficiency.

One possible method that may be used in forming a nanofiber nonwoven product with a lower TDI and/or ODI would be to include additives as described herein, especially antioxidants. Such antioxidants, although not necessary in conventional processes, may be used to inhibit degradation. An example of useful antioxidants include copper halides and Nylostab® S-EED® available from Clariant.

The spinning or melt blowing methods as described herein may also result in a nanofiber nonwoven product having an Air Permeability Value of less than 600 CFM/ft², e.g., less than 590 CFM/ft², less than 580 CFM/ft², less than 570 CFM/ft², less than 560 CFM/ft², or less than 550 CFM/ft². In terms of lower limits, the nanofiber nonwoven product may have an Air Permeability Value of at least 50 CFM/ft2, at least 75 CFM/ft2, at least 100 CFM/ft², at least 125 CFM/ft², at least 150 CFM/ft², or at least 200 CFM/ft². In terms of ranges, the nanofiber nonwoven product may have an Air Permeability Value from 50 to 600 CFM/ft², from 75 to 590 CFM/ft², from 100 to 580 CFM/ft², from 125 to 570 CFM/ft², from 150 to 560 CFM/ft², or from 200 to 550 CFM/ft².

The spinning methods as described herein may also result in a nanofiber nonwoven product having a filtration efficiency, as measured by a TSI 3160 or a TSI 8130 automated filter tester from 1 to 99.999%, e.g., from 1 to 95%, from 1 to 90%, from 1.5 to 85%, or from 2 to 80%. The TSI 3160 Automated Filter Tester is used to test the efficiency of filter materials. Particle penetration and pressure drop are the two important parameters measured using this instrument. Efficiency is 100%—penetration. A challenge solution with known particle size is used. The TSI 3160 is used to measure Hepa filters and uses a DOP solution. It combines an Electrostatic Classifier with dual Condensation Particle Counters (CPCs) to measure most penetrating particle size (MPPS) from 15 to 800 nm using monodisperse particles. And can test efficiencies up to 99.999999%.

Applications

The inventive nanofiber nonwovens are useful in a variety of applications due to their high temperature resistance, barrier, permeability properties, and, processability. The products may be used in multilayer structures including laminates in many cases.

Thus, the products are used in air or liquid filtration in the following sectors: transportation; industrial; commercial and residential.

The products are likewise suitable for barrier applications in breathable fabrics, surgical nonwovens, baby care, adult care, apparel, composites, construction and acoustics. The compositions are useful for sound dampening in automotive, electronic and aircraft applications which may require composites of different fiber sizes for best performance. At higher basis weights, the products are used in connection with beverages, food packaging, transportation, chemical processing and medical applications such as wound dressings or medical implants.

The unique characteristics of the nonwovens of the invention provide functionality and benefits not seen in conventional products, for example, the nonwovens of the invention can be used as packaging for smoked meats.

Embodiments

Embodiment 1: A method of controlling the RV of a polyamide nanofiber nonwoven product, comprising: (a) providing a polyamide composition having an RV from 2 to 330 for spinning; (b) determining a desired RV for the polyamide nanofiber nonwoven product; (c) selecting at least one condition for the spinning selected from temperature, moisture content, and presence of a catalyst; (d) spinning or melt blowing the polyamide composition under the at least one condition into a plurality of nanofibers; and (e) forming the nanofibers into the nanofiber nonwoven product, wherein the product has an average nanofiber diameter from 100 to 1000 nanometers and an RV from 2 to 330.

Embodiment 2: The method according to Embodiment 1, wherein the temperature is from 215° C. to 315° C.

Embodiment 3: The method according to Embodiment 1, wherein the moisture content is from 5 ppm to 5 wt. %.

Embodiment 4: The method according to Embodiment 1, wherein the desired RV of the polyamide nanofiber nonwoven product is greater than the RV of the polyamide composition.

Embodiment 5: The method according to Embodiment 4, wherein the temperature of the spinning step is adjusted to be within the range of 215° C. to 315° C.

Embodiment 6: The method according to Embodiment 4, wherein the moisture content is adjusted within the range of 5 ppm to 5 wt. %.

Embodiment 7: The method according to Embodiment 4, wherein the desired RV of the product is at least 10% greater than the RV of the polyamide composition.

Embodiment 8: The method according to Embodiment 1, wherein the desired RV of product is less than the RV of the polyamide composition.

Embodiment 9: The method according to Embodiment 9, wherein the temperature of the spinning step is increased within the range of 215° C. to 315° C.

Embodiment 10: The method according to Embodiment 9, wherein the moisture content is increased within the range of 5 ppm to 5 wt. %.

Embodiment 11: The method according to Embodiment 9, wherein the desired RV of the product is at least 10% less than the RV of the polyamide composition.

Embodiment 12: The method according to any of the preceding Embodiments, wherein the catalyst comprises benzene phosphinic acid, benzene phosphonic acid, sodium hypophosite, hypophosphorus acid, monosodium phosphate, phosphoric acid, or combinations thereof.

Embodiment 13: The method according to any of the preceding Embodiments, wherein the polyamide composition comprises nylon 66 and/or nylon 6/66.

Embodiment 14: The method according to any of the preceding Embodiments, wherein the melt point of the product is 225° C. or greater.

Embodiment 15: The method according to any of the preceding Embodiments, wherein no more than 20% of the nanofibers have a diameter of greater than 700 nanometers.

Embodiment 16: The method according to any of the preceding Embodiments, wherein the polyamide is a high temperature nylon.

Embodiment 17: The method according to any of the preceding Embodiments, wherein the polyamide comprises N6, N66, N6T/66, N612, N6/66, N6I/66, N66/6I/6T, N11, and/or N12, wherein "N" means Nylon.

Embodiment 18: The method according to any of the preceding Embodiments, wherein the product has an Air Permeability Value of less than 600 CFM/ft$^2$.

Embodiment 19: The method according to any of the preceding Embodiments, wherein the product has a basis weight of 150 GSM or less.

Embodiment 20: The method according to any of the preceding Embodiments, wherein the product has a TDI of at least 20 ppm.

Embodiment 21: The method according to any of the preceding Embodiments, wherein the product has an ODI of at least 1 ppm.

Embodiment 22: The method according to any of the preceding Embodiments, wherein the product is free of solvent.

Embodiment 23: The method according to any of the preceding Embodiments, wherein the product comprises less than 5000 ppm solvent.

Embodiment 24: The method according to any of the preceding Embodiments, wherein the polyamide composition is melt spun by way of melt-blowing through a die into a high velocity gaseous stream.

Embodiment 25: The method according to any of Embodiments 1-23, wherein the polyamide composition is melt-spun by 2-phase propellant-gas spinning, including extruding the polyamide composition in liquid form with pressurized gas through a fiber-forming channel.

Embodiment 26: The method according to any of the preceding Embodiments, wherein the nanofiber nonwoven product is formed by collecting the nanofibers on a moving belt.

Embodiment 27: A method for preparing a polyamide nanofiber nonwoven product wherein from 1 to 20% of the nanofiber diameters are greater than 700 nanometers, comprising: (a) providing a polyamide composition having an RV from 2 to 330 for spinning; (b) spinning or melt blowing the polyamide composition at a temperature in the range of 215° C. to 315° C. into a plurality of nanofibers; and (c) forming the nanofibers into the nanofiber nonwoven product, wherein the product has an RV from 2 to 330.

Embodiment 28: The method according to Embodiment 27, wherein the polyamide composition is spun through a die or capillary.

Embodiment 29: The method according to Embodiment 28, wherein the throughput rate of the polyamide composition through the die or capillary is adjusted without substantially changing the average nanofiber diameter and/or the nanofiber diameter distribution.

Embodiment 30: The method according to Embodiment 28, wherein a number of holes per inch of the die or capillary is adjusted to adjust the average nanofiber diameter and/or the nanofiber diameter distribution.

Embodiment 31: The method according to Embodiment 28, wherein the size of the holes of the die or capillary is adjusted to adjust the average nanofiber diameter and/or the nanofiber diameter distribution.

Embodiment 32: The method according to any of Embodiments 27-31, wherein the desired RV of the polyamide nanofiber product is at least 10% less than the RV of the polyamide composition.

Embodiment 33: The method according to any of Embodiments 27-32, wherein the method is operated at a temperature from 215° C. to 315° C.

Embodiment 34: The method according to any of Embodiments 27-33, wherein the method is operated at a moisture content from 5 ppm to 5 wt. %.

Embodiment 35: The method according to any of Embodiments 27-34, wherein the method is operated in the presence of a catalyst comprising benzene phosphinic acid, benzene phosphonic acid, sodium hypophosite, hypophosphorus acid, monosodium phosphate, phosphoric acid, or combinations thereof.

Embodiment 36: The method according to any of Embodiments 27-35, wherein the polyamide composition comprises nylon 66 and/or nylon 6/66.

Embodiment 37: The method according to any of Embodiments 27-36, wherein the melt point of the product is 225° C. or greater.

Embodiment 38: The method according to any of Embodiments 27-37, wherein no more than 20% of the nanofibers have a diameter of greater than 700 nanometers.

Embodiment 39: The method according to any of Embodiments 27-38, wherein the polyamide is a high temperature nylon.

Embodiment 40: The method according to any of Embodiments 27-39, wherein the polyamide comprises N6, N66, N6T/66, N612, N6/66, N6I/66, N66/6I/6T, N11, and/or N12, wherein "N" means Nylon.

Embodiment 41: The method according to any of Embodiments 27-40, wherein the product has an Air Permeability Value of less than 600 CFM/ft$^2$.

Embodiment 42: The method according to any of Embodiments 27-41, wherein the product has a basis weight of 150 GSM or less.

Embodiment 43: The method according to any of Embodiments 27-42, wherein the product has a TDI of at least 20 ppm.

Embodiment 44: The method according to any of Embodiments 27-43, wherein the product has an ODI of at least 1 ppm.

Embodiment 45: The method according to any of Embodiments 27-44, wherein the product is free of solvent.

Embodiment 46: The method according to any of Embodiments 27-45, wherein the product comprises less than 5000 ppm solvent.

Embodiment 47: The method according to any of the Embodiments 27-46, wherein the polyamide composition is melt spun by way of melt-blowing through a die into a high velocity gaseous stream.

Embodiment 48: The method according to any of Embodiments 27-46, wherein the polyamide composition is melt-spun by 2-phase propellant-gas spinning, including extruding the polyamide composition in liquid form with pressurized gas through a fiber-forming channel.

Embodiment 49: The method according to any of Embodiments 27-48, wherein the nanofiber nonwoven product is formed by collecting the nanofibers on a moving belt.

Embodiment 50: A method of manufacturing a polyamide nanofiber nonwoven product, comprising: (a) providing a polyamide composition having an RV from 2 to 330 for spinning; (b) determining one or more desired properties for the polyamide nanofiber nonwoven product, the properties comprising average nanofiber diameter, nanofiber diameter distribution, air permeability value, TDI, ODI, relative viscosity, mean pore flow diameter, and filtration efficiency; (c) selecting equipment to spin the polyamide composition to produce the polyamide nanofiber nonwoven product; (d) optionally adjusting the RV of the polyamide composition based upon at least one of the desired properties of the polyamide nanofiber nonwoven product and the selected equipment; (e) spinning or melt blowing the polyamide composition into a plurality of nanofibers at a temperature; and (f) forming the nanofibers into the nanofiber nonwoven product, wherein the product has an average nanofiber diameter from 100 to 1000 nanometers and an RV from 2 to 330.

Embodiment 51: The method according to Embodiment 50, wherein the equipment comprises a fiber extrusion pack including a number of split distribution plates arranged in a stack to form a distribution network.

Embodiment 52: The method according to Embodiment 50, wherein the equipment comprises a two-phase flow nozzle and a converging channel; wherein the converging channel accelerates the polyamide composition from the two-phase flow nozzle to a channel exit to form a polymeric film along the surface of the converging channel, wherein the polymeric film is fibrillated at the channel exit to form the nanofibers; and collecting the nanofibers to form the product.

Embodiment 53: The method according to Embodiment 50, wherein the equipment comprises a fiber producing device comprising a body configured to receive the polyamide composition, a driver capable of rotating the body, a deposition system for directing nanofibers formed in the body toward a substrate, and a substrate transfer system for moving substrate material through a deposition system for directing the nanofibers to the substrate.

Embodiment 54: The method according to Embodiment 50, wherein the polyamide composition is spun through a die or capillary.

Embodiment 55: The method according to Embodiment 54, wherein the throughput rate of the polyamide composition through the die or capillary is adjusted without substantially changing the average nanofiber diameter and/or the nanofiber diameter distribution.

Embodiment 56: The method according to Embodiment 54, wherein a number of holes per inch of the die or capillary is adjusted to adjust the average nanofiber diameter and/or the nanofiber diameter distribution.

Embodiment 57: The method according to Embodiment 54, wherein the size of the holes of the die or capillary is adjusted to adjust the average nanofiber diameter and/or the nanofiber diameter distribution.

Embodiment 58: The method according to any of Embodiments 50-57, wherein the desired RV of the polyamide nanofiber product is at least 10% less than the RV of the polyamide composition.

Embodiment 59: The method according to any of Embodiments 50-58, wherein the polyamide composition RV is adjusted by operating at a temperature from 215° C. to 315° C.

Embodiment 60: The method according to any of Embodiments 50-59, wherein the polyamide composition RV is adjusted by operating at a moisture content from 5 ppm to 5 wt. %.

Embodiment 61: The method according to any of Embodiments 50-60, wherein the polyamide composition RV is adjusted by operating in the presence of a catalyst comprising benzene phosphinic acid, benzene phosphonic acid, sodium hypophosite, hypophosphorus acid, monosodium phosphate, phosphoric acid, or combinations thereof.

Embodiment 62: The method according to any of Embodiments 50-61, wherein the polyamide composition comprises nylon 66 and/or nylon 6/66.

Embodiment 63: The method according to any of Embodiments 50-62, wherein the melt point of the product is 225° C. or greater.

Embodiment 64: The method according to any of Embodiments 50-63, wherein no more than 20% of the nanofibers have a diameter of greater than 700 nanometers.

Embodiment 65: The method according to any of Embodiments 50-64, wherein the polyamide is a high temperature nylon.

Embodiment 66: The method according to any of Embodiments 50-65, wherein the polyamide comprises N6, N66, N6T/66, N612, N6/66, N6I/66, N66/6I/6T, N11, and/or N12, wherein "N" means Nylon.

Embodiment 67: The method according to any of Embodiments 50-66, wherein the product has an Air Permeability Value of less than 600 CFM/ft$^2$.

Embodiment 68: The method according to any of Embodiments 50-67, wherein the product has a basis weight of 150 GSM or less.

Embodiment 69: The method according to any of Embodiments 50-68, wherein the product has a TDI of at least 20 ppm.

Embodiment 70: The method according to any of Embodiments 50-69, wherein the product has an ODI of at least 1 ppm.

Embodiment 71: The method according to any of Embodiments 50-70, wherein the product is free of solvent.

Embodiment 72: The method according to any of Embodiments 50-71, wherein the product comprises less than 5000 ppm solvent.

Embodiment 73: The method according to any Embodiment 50, wherein the polyamide composition is melt spun by way of melt-blowing through a die into a high velocity gaseous stream.

Embodiment 74: The method according to Embodiment 50, wherein the polyamide composition is melt-spun by 2-phase propellant-gas spinning, including extruding the polyamide composition in liquid form with pressurized gas through a fiber-forming channel.

Embodiment 75: The method according to Embodiment 50, wherein the nanofiber nonwoven product is formed by collecting the nanofibers on a moving belt.

Embodiment 76: The method according to Embodiment 50, wherein the RV of the polyamide composition is adjusted by adjusting the ratio of amine to carboxylic acid groups in the polyamide composition.

Embodiment 77: The method according to Embodiment 76, wherein the ratio of amine to carboxylic acid end group in the polyamide composition is from 1:100 to 100:1.

Embodiment 78: A method of manufacturing a polyamide nanofiber nonwoven product, comprising: (a) determining one or more desired properties for the polyamide nanofiber nonwoven product, the properties comprising average nanofiber diameter, nanofiber diameter distribution, air permeability value, TDI, ODI, relative viscosity, mean pore flow diameter, and filtration efficiency; (b) selecting equipment to spin the polyamide composition to produce the polyamide nanofiber nonwoven product; (c) determining a preferred RV of the polyamide composition based upon at least one of the desired properties of the polyamide nanofiber nonwoven product and the selected equipment; (d) providing a polyamide composition having the preferred RV, wherein the RV of the polyamide composition is adjusted during or subsequent to polymerization of the polyamide composition; (e) spinning or melt blowing the polyamide composition into a plurality of nanofibers at a temperature; and (f) forming the nanofibers into the nanofiber nonwoven product, wherein the product has the desired properties.

Embodiment 79: The method according to Embodiment 78, wherein the preferred RV of the polyamide composition is from 2 to 330.

Embodiment 80: The method according to Embodiment 78, wherein the nanofiber nonwoven product has an RV from 2 to 330.

Embodiment 81: The method according to Embodiment 78, wherein the RV of the polyamide composition is adjusted by adjusting the ratio of amine to carboxylic acid groups in the polyamide composition.

Embodiment 82: The method according to Embodiment 81, wherein the ratio of amine to carboxylic acid end group in the polyamide composition is from 100:1 to 1:100.

Embodiment 83: The method according to Embodiment 78, wherein the polyamide composition is spun through a die or capillary.

Embodiment 84: The method according to Embodiment 83, wherein a throughput rate of the polyamide composition through the die or capillary is adjusted without substantially changing the average nanofiber diameter and/or the nanofiber diameter distribution.

Embodiment 85: The method according to Embodiment 83, wherein a number of holes per inch of the die or capillary is adjusted to adjust the average nanofiber diameter and/or the nanofiber diameter distribution.

Embodiment 86: The method according to Embodiment 83, wherein the size of the holes of the die or capillary is adjusted to adjust the average nanofiber diameter and/or the nanofiber diameter distribution.

Embodiment 87: The method according to any of Embodiments 81-86, wherein the RV of the polyamide nanofiber product is at least 10% less than the RV of the polyamide composition.

Embodiment 88: The method according to any of Embodiments 81-87, wherein the polyamide composition RV is adjusted by operating at a temperature from 215° C. to 315° C.

Embodiment 89: The method according to any of Embodiments 81-88, wherein the polyamide composition RV is adjusted by operating at a moisture content from 5 ppm to 5 wt. %.

Embodiment 90: The method according to any of Embodiments 81-89, wherein the polyamide composition RV is adjusted by operating in the presence of a catalyst comprising benzene phosphinic acid, benzene phosphonic acid, sodium hypophosite, hypophosphorus acid, monosodium phosphate, phosphoric acid, or combinations thereof.

Embodiment 91: The method according to any of Embodiments 81-90, wherein the polyamide composition comprises nylon 66 and/or nylon 6/66.

Embodiment 92: The method according to any of Embodiments 81-91, wherein the melt point of the product is 225° C. or greater.

Embodiment 93: The method according to any of Embodiments 81-92, wherein no more than 20% of the nanofibers have a diameter of greater than 700 nanometers.

Embodiment 94: The method according to any of Embodiments 81-93, wherein the polyamide composition is a high temperature nylon.

Embodiment 95: The method according to any of Embodiments 81-94, wherein the polyamide composition comprises N6, N66, N6T/66, N612, N6/66, N6I/66, N66/6I/6T, N11, and/or N12, wherein "N" means Nylon.

Embodiment 96: The method according to any of Embodiments 81-95, wherein the product has an Air Permeability Value of less than 600 CFM/ft$^2$.

Embodiment 97: The method according to any of Embodiments 81-96, wherein the product has a basis weight of 150 GSM or less.

Embodiment 98: The method according to any of Embodiments 81-97, wherein the product has a TDI of at least 20 ppm.

Embodiment 99: The method according to any of Embodiments 81-98, wherein the product has an ODI of at least 1 ppm.

Embodiment 100: The method according to any of Embodiments 81-99, wherein the product is free of solvent.

Embodiment 101: The method according to any of Embodiments 81-100, wherein the product comprises less than 5000 ppm solvent.

Embodiment 102: The method according to any of the Embodiments 81-101, wherein the polyamide composition is melt spun by way of melt-blowing through a die into a high velocity gaseous stream.

Embodiment 103: The method according to any of Embodiments 81-102, wherein the polyamide composition is melt-spun by 2-phase propellant-gas spinning, including extruding the polyamide composition in liquid form with pressurized gas through a fiber-forming channel.

Embodiment 104: The method according to any of Embodiments 81-103, wherein the nanofiber nonwoven product is formed by collecting the nanofibers on a moving belt.

Embodiment 105: The method according to Embodiment 78, wherein the equipment comprises a fiber extrusion pack including a number of split distribution plates arranged in a stack to form a distribution network.

Embodiment 106: The method according to Embodiment 78, wherein the equipment comprises a two-phase flow nozzle and a converging channel, wherein the converging channel accelerates the polyamide composition from the two-phase flow nozzle to a channel exit to form a polymeric film along the surface of the converging channel, wherein the polymeric film is fibrillated at the channel exit to form the nanofibers; and collecting the nanofibers to form the product.

Embodiment 107: The method according to Embodiment 78, wherein the equipment comprises a fiber producing device comprising a body configured to receive the polyamide composition, a driver capable of rotating the body, a deposition system for directing nanofibers formed in the body toward a substrate, and a substrate transfer system for moving substrate material through a deposition system for directing the nanofibers to the substrate.

Embodiment 108: A method of manufacturing a polyamide nanofiber nonwoven product, comprising: (a) providing a polyamide composition having an initial RV for spinning; (b) determining one or more desired properties for the polyamide nanofiber nonwoven product, the properties comprising average nanofiber diameter, nanofiber diameter distribution, air permeability value, TDI, ODI, relative viscosity, mean pore flow diameter, and filtration efficiency; (c) adjusting the initial RV of the polyamide composition based upon at least one of the desired properties to provide an adjusted polyamide composition; (d) spinning or melt blowing the adjusted polyamide composition into a plurality of nanofibers at a temperature; and (f) forming the nanofibers into the nanofiber nonwoven product, wherein the product has an average nanofiber diameter from 100 to 1000 nanometers and an RV from 2 to 330.

Embodiment 109: The process of Embodiment 108, wherein the adjusting is based on at least one condition for the spinning, the condition comprising temperature, moisture content, and presence of a catalyst.

Embodiment 110: A method of manufacturing a polyamide nanofiber nonwoven product, comprising: (a) determining at least one desired property for the polyamide nanofiber nonwoven product, the at least one desired property comprising average nanofiber diameter, nanofiber diameter distribution, air permeability value, TDI, ODI, relative viscosity, mean pore flow diameter, and filtration efficiency; (c) determining at least one condition to form the product with the desired at least one property; (d) spinning or melt blowing the polyamide composition into a plurality of nanofibers at a temperature; and (e) forming the nanofibers into the nanofiber nonwoven product, wherein the product has the at least one desired property.

Embodiment 111: The method according to Embodiment 110, wherein the at least one condition is the type of equipment.

Embodiment 112: The method according to Embodiment 110, wherein the at least one condition is the RV of the polyamide composition.

Embodiment 113: A method for tuning characteristics of a polyamide nanofiber nonwoven comprising the steps of targeting a specific average nanofiber diameter and/or a specific relative viscosity for the polyamide nanofiber nonwoven, wherein the specific average nanofiber diameter is within a range from 100 nm to 1000 nm and/or the specific relative viscosity is within a range from 5 to 75 from 15 to 50 or from 20 to 40, extruding a polyamide composition having a moisture content with a pressurized gas through a fiber forming channel having a channel temperature to form the polyamide nanofiber nonwoven having the target average nanofiber diameter and/or relative viscosity, and controlling the moisture content, the pressure of pressurized gas, and/or the channel temperature based on the specific average nanofiber diameter and/or the specific relative viscosity.

Embodiment 114: The method of Embodiment 113, wherein the specific average nanofiber diameter is within a range of 200 nm to 700 nm.

Embodiment 115: The method of Embodiment 113, wherein the specific relative viscosity is within a range from 15 to 50 or from 20 to 40.

Embodiment 116: The method of Embodiment 113, wherein the moisture content is controlled from 0.005 wt. % to 1 wt. %, e.g., from 0.005 wt. % to 0.5 wt. %.

Embodiment 117: The method of Embodiment 113, wherein the moisture content is controlled by drying the polyamide composition to have a moisture content of less than 0.02 wt. %, and rehydrating the dried polyamide composition.

Embodiment 118: The method of Embodiment 113, wherein the pressure of the pressurized gas is controlled to range from 160 kPa to 220 kPa.

Embodiment 119: The method of Embodiment 113, wherein the channel temperature is controlled to range from 270° C. to 330° C.

Embodiment 120: The method of Embodiment 113, wherein the fiber forming channel comprises a die and/or a capillary.

Embodiment 121: The method of Embodiment 113, wherein the polyamide nanofiber nonwoven is melt-blown and/or is free of solvent.

Embodiment 122: The method of Embodiment 113, wherein the polyamide composition comprises a catalyst.

Embodiment 123: A method for tuning the relative viscosity of a polyamide nanofiber nonwoven comprising the steps of targeting a specific relative viscosity for the polyamide nanofiber nonwoven, wherein the specific relative viscosity is within a range from 5 to 75, extruding a polyamide composition having a moisture content to form the polyamide nanofiber nonwoven having the target relative viscosity, and controlling the moisture content based on the target relative viscosity.

Embodiment 124: The method of Embodiment 123, wherein the relative viscosity is targeted to a targeted relative viscosity within the range from 15 to 50 or from 20 to 40.

Embodiment 125: The method of Embodiment 123, wherein the moisture content is controlled to range from 0.005 wt. % to 1 wt. %, e.g., from 0.005 wt. % to 0.5 wt. %.

Embodiment 126: The method of Embodiment 123, wherein the moisture content is controlled to range from 0.02 wt. % to 0.3 wt. %.

Embodiment 127: The method of Embodiment 123, wherein the controlling comprises drying the polyamide composition to have a moisture content of less than 0.02 wt. %, and rehydrating the dried polyamide composition.

Embodiment 128: The method of Embodiment 123, wherein the polyamide composition is extruded through a fiber forming channel having a channel temperature and the channel temperature is controlled to range from 270° C. to 330° C.

Embodiment 129: The method of Embodiment 123, wherein the polyamide nanofiber nonwoven is melt-blown and/or is free of solvent.

Embodiment 130: The method of Embodiment 123, wherein the polyamide composition comprises a catalyst.

Embodiment 131: A method for tuning the nanofiber diameter of a polyamide nanofiber nonwoven comprising the steps of targeting a specific average nanofiber diameter, wherein the specific average nanofiber diameter is within a range from 100 nm to 1000 nm, extruding a polyamide composition with a pressurized gas to form the polyamide nanofiber nonwoven having the target average nanofiber diameter, and controlling the pressure of the pressurized gas based on the target average nanofiber diameter.

Embodiment 132: The method of Embodiment 131, wherein the fiber diameter is targeted to a target average nanofiber diameter within the range of 200 nm to 700 nm.

Embodiment 133: The method of Embodiment 131, wherein the pressurized gas is controlled to range from 160 kPa to 220 kPa.

Embodiment 134: The method of Embodiment 131, wherein the polyamide composition is extruded through a fiber forming channel having a channel temperature and the channel temperature is controlled to range from 270° C. to 330° C.

Embodiment 135: The method of Embodiment 131, wherein the polyamide composition has a moisture content and the moisture content is controlled to range from 0.005 wt. % to 1 wt. %, e.g., from 0.005 wt. % to 0.5 wt. %.

Embodiment 136: The method of Embodiment 131, wherein the polyamide nanofiber nonwoven is melt-blown and/or is free of solvent.

The present disclosure is further understood by the following non-limiting examples.

EXAMPLES

Example 1—Product RV and Average Fiber Diameter Tuned Based on Moisture Content Low TDI/ODI (and a similar or slightly higher RV from polyamide to product) were selected as desired target product parameters. The starting RV of the polyamide composition was 7.3. Utilizing the melt spin procedures and apparatus as described in U.S. Pat. No. 8,668,854 (shown generally in FIG. 1), Nylon 66 was spun onto a moving drum to produce nonwoven webs. For this example, the targeted specific RV was 10 and to achieve the specific RV, a moisture content of 0.28 wt. % was used. A target specific fiber diameter range of 400 to 700 nm was selected.

The process employed an extruder with a high compression screw, operating at 20 RPM. The screw temperature profile was tuned to reflect steps of 245° C., 255° C., 265° C., and 265° C. The (precursor) polyamide temperature was tuned to 252° C. and nitrogen was used as the gas. Two nonwoven webs were produced (Samples 1 and 2), each having different basis weights. Sample 2 with the higher basis weight was made by the same process, but the nanofibers were spun onto a scrim. In this instance, the scrim was merely used for adding integrity to the inventive nanofiber web. The RV of the polyamide was set at or adjusted to 7.3 (before spinning). To reduce the sensitivity of the relative viscosity of the low RV polyamide to moisture content, to, the polyamide was prepared using an excess of about 5% adipic acid.

The nonwoven webs were characterized for average fiber diameter, basis weight, air permeability in accordance with the Hassan et al. article noted above. Water vapor transmission rate was also measured ($g/m^2/24$ hr) according to ASTM E96, Procedure B (2016).

Figure 3:
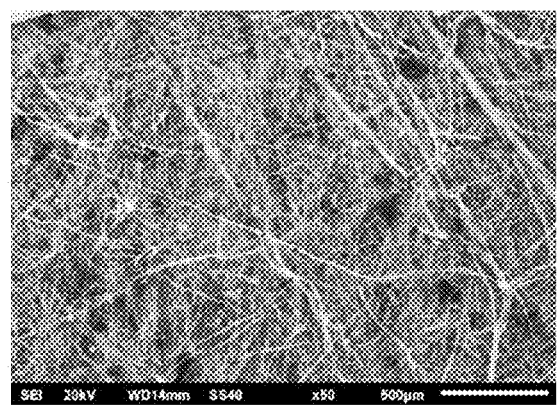
FIG. 3 is a photomicrograph of a nanofiber nylon 66 melt spun into a nonwoven having an RV of 7.3 at a magnification of 50×.
Figure 4:
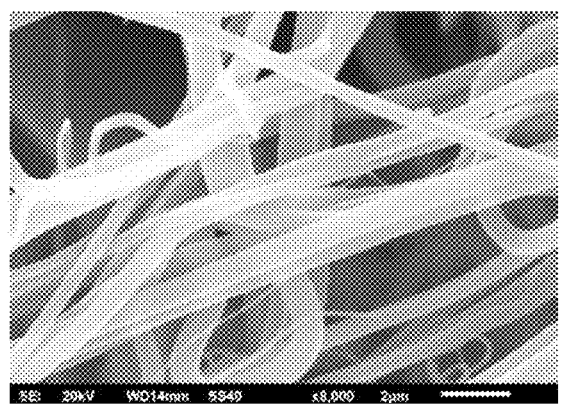
FIG. 4 is a photomicrograph of a nanofiber of a grade from FIG. 3 of nylon 66 melt spun into a nonwoven having an RV of 7.3 at a magnification of 8000×.

The results are shown in Table 1, and the nonwoven mats are shown in the photomicrographs of FIGS. 3 and 4. The nanofibers of the nonwoven mats had an average fiber diameter ranging from 470 nm to 680 nm (575 nm average). the use of these moisture contents provided for a melt spun nanofiber nonwoven web, the nanofibers of which had a fiber diameter averaging 570 for the initial RV of 7.3. Further, TDI and ODI numbers were surprisingly low and product RV was slightly higher than initial RV. Air Permeability was about 182.8 $CFM/ft^2$, while water vapor transmission rate averaged about 1100 $g/m^2/24$ hrs. Such fiber diameters and performance characteristics have not been achieved using conventional polyamide precursors and/or processes. It is believed that utilizing/tuning the RV of the resin and/or the temperature profile and/or nitrogen and/or moisture content are the main reasons for the superior TDI and ODI results and/or the final RV being similar or slightly higher than the initial RV.

Figure 5:
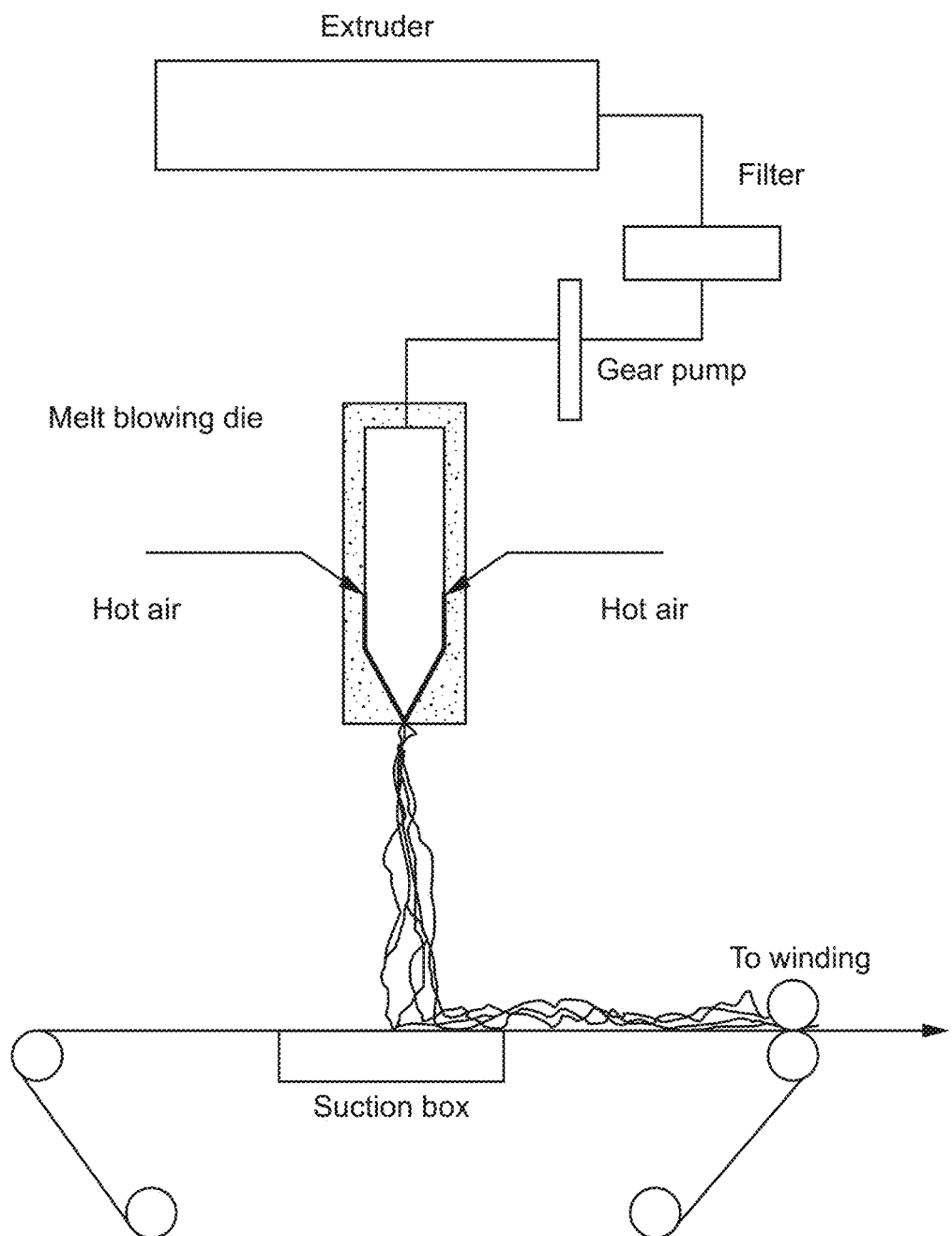
FIG. 5 is a schematic diagram of a melt blowing process in connection with embodiments of the present invention.
Figure 6:
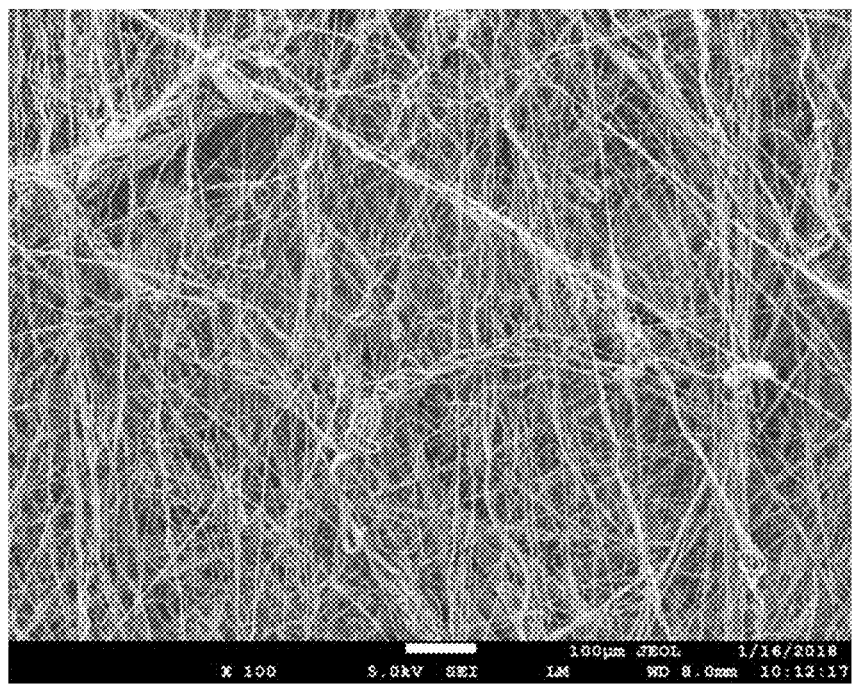
FIG. 6 is a photomicrograph of a nanofiber of nylon 66 with an RV of 36 at a magnification of 100×.

Example 2—Product RV and Fiber Diameter Tuned Based on Moisture Content and Channel Temperature The moisture content and channel temperature (die temperature) were tuned to provide desired basis weight, air permeability, fiber diameter, product RV filtration efficiency, mean pore size pressure, mean pore size diameter, and other features, as shown below. Nylon 66 polyamide having an RV of 36 was melt spun and pumped to melt blown dies (utilizing the melt spin pack described in U.S. Pat. No. 7,300,272 and illustrated in FIG. 5) to produce nonwoven nanofiber webs. In the various samples, the moisture levels of nylon 66 ranged from about 0.2 wt. % to about 0.3 wt. %. An extruder with three zones was used, and the extruder operated at temperatures ranging from 233° C. to 310° C. The die temperature ranged from 286° C. to 318° C. Heated air was used as the gas. The nanofibers were deposited onto a 10 gsm thermally bonded, nylon spunbond scrim commercially available from Cerex Advanced Fabrics, Inc. under the trademark PBN-II®. Of course, other spunbond fabrics can be used, for example, a polyester spun bond fabric, a polypropylene spunbond fabric, a nylon melt blown fabric or other woven, knit, needlepunched, or other nonwoven fabrics. No solvents or adhesives were used during the melt spinning or deposition processes.

TABLE 1

Example 1: Precursor Polyamide and Product Properties

| Sample | PA RV | Fiber diameter, nm | Basis weight, GSM | Air permeability ($CFM/ft^2$) | WVTR $g/m^2/$ 24 hr | TDI | ODI | Final RV |
|---|---|---|---|---|---|---|---|---|
| 1 | 7.3 | 680 | 68 | 182.8 | 1140 | 56 | 12 | 10 |
| 2 | 7.3 | 470 | 118 | 182.8 | 1056 | 48 | 8 | 9.9 |

Thus, the results in Table 1 demonstrate that moisture content can be tuned to achieve the targeted specific product RV and specific average nanofiber diameter. For example, Various fabrics were made with webs of nanofibers. The properties and performance characteristics of several specific samples are summarized in Table 2.

TABLE 2

Example 2: Precursor Polyamide and Product Properties

| Sample | Product RV | Average Fiber diameter, (microns) | Basis weight, (gsm) | Nanofiber layer thickness (microns) | Air permeability (CFM/ft$^2$) | Mean pore size diameter (microns) | Mean pore size pressure (PSI) | Filtration Efficiency (%) |
|---|---|---|---|---|---|---|---|---|
| 3 | 27.5 | 0.374 | 3.0 | N/A | 187 | 10.1 | 0.653 | 24.69 |
| 4 | 25.2 | 0.595 | 21.2 | N/A | 21.9 | 5.0 | 1.320 | 76.70 |
| 5 | 28.3 | 0.477 | 1.0 | N/A | 1002 | 84.1 | 0.81 | 2.71 |
| 6 | 22.9 | 0.577 | 2.8 | 44.8 | 354 | 20.0 | 0.358 | 10.38 |
| 7 | 24.1 | 0.601 | 7.3 | 60 | 75.7 | 7.2 | 0.919 | 40.68 |
| 8 | 23.9 | 0.490 | 10.1 | 88 | 52.9 | 5.9 | 1.121 | 53 |
| 9 | 23.5 | 0.53 | 13.2 | 101.5 | 31.5 | 5.4 | 1.235 | 66.00 |

As indicated in Table 2, the disclosed process surprisingly yields nanofibers and nonwoven mats having synergistic combinations of features, e.g., RV and fiber diameter. The nanofiber nonwoven mats were successfully made using the above described process, in various basis weights with a wide range of properties. Process settings can be adjusted to provide nanofiber fabrics with a variety of properties as required for the application as illustrated in Table 2.

Example 3—Product RV and Fiber Diameter Tuned Based on Moisture Content and Channel Temperature The moisture content and channel temperature of the following process were tuned to reduce the RV of the fabric as compared to the starting polyamide composition. A nylon 66 polyamide composition with an RV in the range of about 34 to 37 was used with the pack described in U.S. Pat. No. 7,300,272 to make nanofibers with an RV of about 16.8. This is a reduction in RV from polyamide composition to fabric of about 17.2 to 20.2 RV. The polyamide composition contained about 1 wt. % moisture and was run on a small extruder with three zones ranging in temperature from 233 to 310° C. A die temperature of about 308° C. was used. No solvents or adhesives were used during the melt spinning or deposition processes.

Example 4—Product RV and Fiber Diameter Tuned Based on Moisture Content and Channel Temperature The moisture content and channel temperature of the following process were tuned to reduce the RV of the fabric as compared to the starting polyamide composition. A nylon 66 polyamide composition with an RV in the range of about 34 to 37 with the pack described in U.S. Pat. No. 7,300,272 to make nanofibers with an RV of about 19.7. This is a reduction in RV from polyamide composition to fabric of about 14.3 to 17.3 RV units. The polyamide composition had a moisture content of 1 wt. % and was run on a small extruder with three zones ranging in temperature from 233 to 310° C. A die temperature of about 277° C. was used. No solvents or adhesives were used during the melt spinning or deposition processes. As shown, by lowering the temperature relative to that used in Example 3, the product RV was greater than in Example 3 with the same moisture content.

Example 5—Product RV and Fiber Diameter Tuned Based on Moisture Content and Channel Temperature The components of the polyamide composition, channel temperature, and moisture content were tuned to adjust the RV of the product as compared to Examples 3 and 4. A nylon 66 polyamide composition with an RV in the range of about 34 to 37 was used with 2% nylon 6 blended in. The pack described in U.S. Pat. No. 7,300,272 was used to make nanofibers with an RV of about 17.1. This is a reduction in RV from polyamide composition to fabric of about 16.9 to 19.9 RV units. The polyamide composition had a moisture content of 1 wt. % and was run on a small extruder with three zones ranging in temperature from 233 to 310° C. A die temperature of about 308° C. was used. No solvents or adhesives were used during the melt spinning or deposition processes.

Example 6 Product RV and Fiber Diameter Tuned Based on Moisture Content

Seven polyamide compositions with varied RV's were provided as shown below in Table 3. The components of the polyamide, the polyamide composition RV, and the moisture content were tuned to form the product having the targeted RV, fiber diameter, ODI and TDI values shown below. The pack described in U.S. Pat. No. 7,300,272 was used to make nanofibers with RV values as reported below. Samples were made on a small single screw extruder with a high residence time. Initially, Samples 10 and 11 were made by feeding more than enough chips into the feed hopper of the extruder, the so-called "flood feeding" scheme. In order to reduce the transition time between items, the extruder and die (or pack) were starved of polyamide composition after Sample 11. This example shows that a wide variety of nylon copolymers can be used to make nylon nanofibers with fiber diameters in the 0.53 to 0.68 micron range. Fiber diameters may be changed by changing process parameters, polymer formulations, or polymer types (copolymers). Based on the way the samples were created, it is difficult to draw conclusions on the degradation indices of these fabrics other than Samples 10 and 11. Samples 10 and 11 indicate that the addition of nylon 6 decreased the thermal degradation of the final nanofiber fabric. Comparing these samples to sample 16 also shows that adding nylon 6 decreases the fiber diameter. Sample 13 shows that the RV was reduced from 303.1 to 33.3. This is a reduction of 269.8 units or an 89% reduction in RV.

TABLE 3

Example 6: Precursor Polyamide and Product Properties

| Sample | Components | Polyamide RV | % Nylon 6,6 | Moisture (%) | Fiber Diameter (microns) | Product RV | ODI (ppm) | TDI (ppm) |
|---|---|---|---|---|---|---|---|---|
| 10 | Nylon 66/nylon 6 | 39.2 | 16 | 0.081 | 0.531 | 29.7 | 75 | 798 |
| 11 | Nylon 66/nylon 6 | 33.0 | 23 | 0.077 | 0.540 | 35.9 | 142 | 169 |
| 12 | Nylon 66 | 124 | 100 | 0.035 | 0.588 | 39.1 | 182 | 1613 |
| 13 | Nylon 66 | 303 | 100 | 0.018 | 0.638 | 33.3 | 208 | 1792 |
| 14 | Nylon 66/nylon 6I | 43.6 | 85 | 0.087 | 0.588 | 26.1 | 172 | 2232 |
| 15 | Nylon 66/nylon 6T | 44.8 | 65 | 0.042 | N/A | N/A | 224 | 2383 |
| 16 | Nylon 66 | 36 | 100 | 0.022 | 0.684 | 15.2 | 1430 | >4000 |

Example 7—Tuning Based on Moisture Content and Channel Temperature

Figure 7:
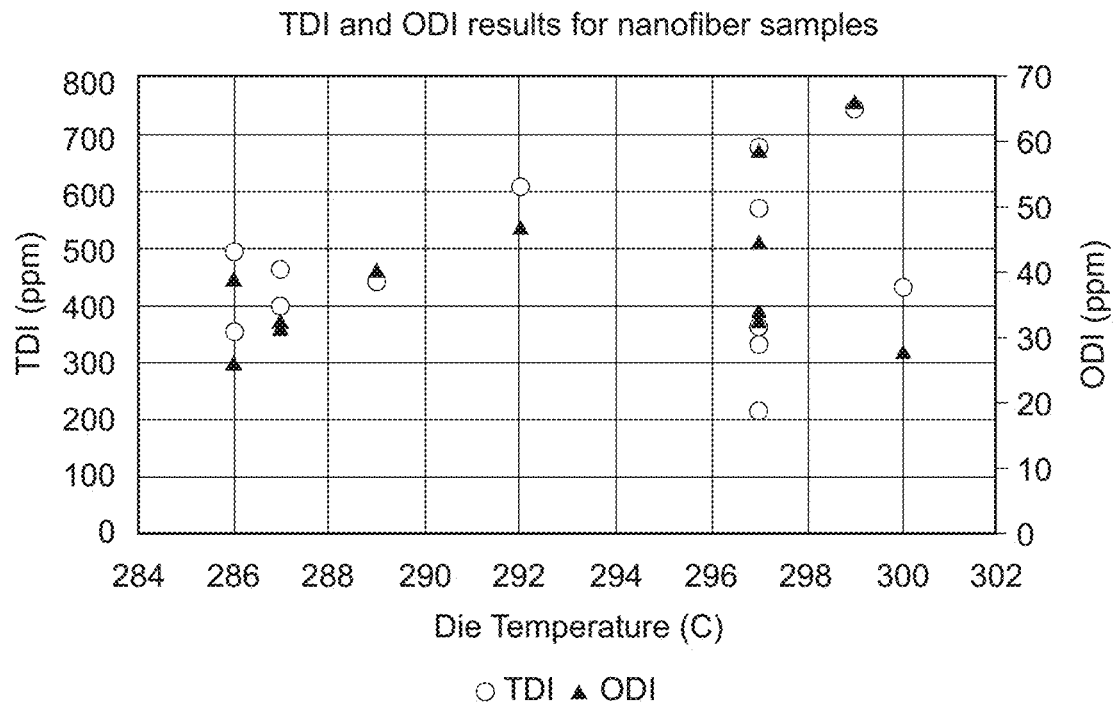
FIG. 7 is a graph comparing thermal degradation index and oxidative degradation index values for nanofiber samples as a function of die temperature.
Figure 8:
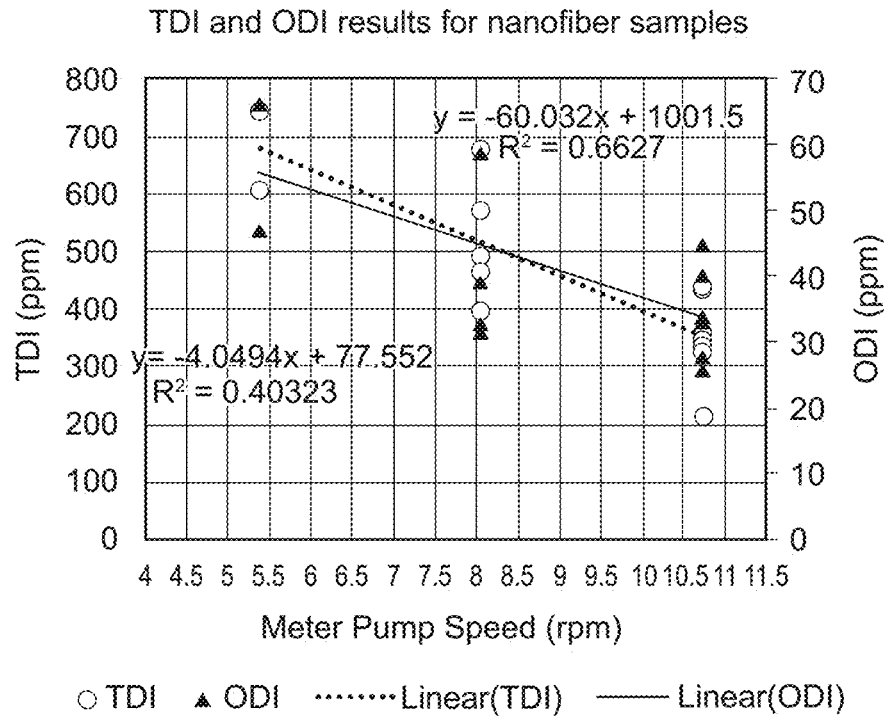
FIG. 8 is a graph comparing thermal degradation index and oxidative degradation index values for nanofiber samples as a function of meter pump speed.

The channel temperature and equipment residence time were tuned to study the effect on ODI and TDI. The moisture content and basis weight were also tuned. The same nylon 66 polyamide composition with an RV in the range of about 34 to 37 that was used in example 3 was run in each of these samples. These samples were made on a slightly larger extruder and a much larger die (pack) with a much smaller residence time than those in Table 3 with the same polyamide composition as that used to make sample 16. The die temperature, basis weight, and moisture content were varied. Table 4 below shows the conditions and results. The results are also shown in the graphs in FIGS. 7 and 8. As shown in Table 4 below, changing process variables does not dramatically change the ODI, illustrating a robust process for oxidative degradation. As shown in FIG. 8, as the meter pump speed decreased, the ODI and TDI generally increased with the TDI increasing at a higher percentage than the ODI. When compared to Sample 16 in Table 3, these samples show that the ODI and the TDI was lowered as this equipment used to run the nanofiber nonwoven fabric was designed for a lower residence time.

TABLE 4

Example 7: TDI and ODI Values

| Sample | Moisture (wt. %) | Basis Weight | Die Temp. (° C.) | Meter Pump Speed (rpm) | TDI (ppm) | ODI (ppm) |
|---|---|---|---|---|---|---|
| 16 | 0.2 | 13.2 | 299 | 5.37 | 745 | 66 |
| 17 | 0.2 | 18.4 | 292 | 5.37 | 608 | 47 |
| 18 | 0.3 | 3.7 | 297 | 8.05 | 572 | 59 |
| 19 | 0.2 | 3.2 | 297 | 8.05 | 676 | 59 |
| 20 | 0.2 | 6.2 | 297 | 10.73 | 214 | 34 |
| 21 | 0.2 | 11 | 297 | 10.73 | 364 | 33 |
| 22 | 0.2 | 11 | 297 | 10.73 | 333 | 45 |
| 23 | 0.2 | 4.4 | 287 | 8.05 | 398 | 33 |
| 24 | 0.2 | 6.1 | 286 | 10.73 | 354 | 26 |
| 25 | 0.2 | 8 | 286 | 8.05 | 492 | 39 |
| 26 | 0.3 | 4.1 | 287 | 8.05 | 464 | 32 |
| 27 | 0.3 | 6 | 300 | 10.73 | 433 | 28 |
| 28 | 0.3 | 6 | 289 | 10.73 | 441 | 40 |

Example 8 Tuning Based on Moisture Content

The moisture level and the basis weight were tuned to study their effect on pressure drop. Nylon 66 polyamide having an RV of 36 was melt spun and pumped to melt blown dies (utilizing the melt spin pack described in U.S. Pat. No. 7,300,272 and illustrated in FIG. 5) to produce nonwoven nanofiber webs. The moisture level of nylon 66 was about 0.22 wt. %. An extruder with three zones was used, and the extruder operated at temperatures ranging from 233° C. to 310° C. The channel temperature was 295° C. Heated air was used as the gas. The nanofibers were deposited onto a 10 gsm thermally bonded, nylon spunbond scrim commercially available from Cerex Advanced Fabrics, Inc. under the trademark PBN-II®. Of course, other spunbond fabrics can be used, for example, a polyester spun bond fabric, a polypropylene spunbond fabric, a nylon melt blown fabric or other woven, knit, needlepunched, or other nonwoven fabrics. No solvents or adhesives were used during the melt spinning or deposition processes, and neither the polyamide or the resultant product contained solvent or adhesive. The collector belt speed was set to make a fabric with a nylon 6,6 nanofiber layer of 82 gsm basis weight. This fabric had an efficiency of 97.9%, a pressure drop of 166.9 Pascals and a penetration of 2.1% as measured using the TSI 3160 previously discussed. This fabric had a mean flow pore diameter average of 5.8 microns with a range from 3.2 to 8 microns. The air permeability of this fabric was 8.17 cfm/square foot. The thickness of the nanofiber layer was 625 microns. The fabric were with the targeted RV and fiber diameter ranges disclosed herein.

Example 9—Product RV Tuned Based on Moisture Content

Figure 9:
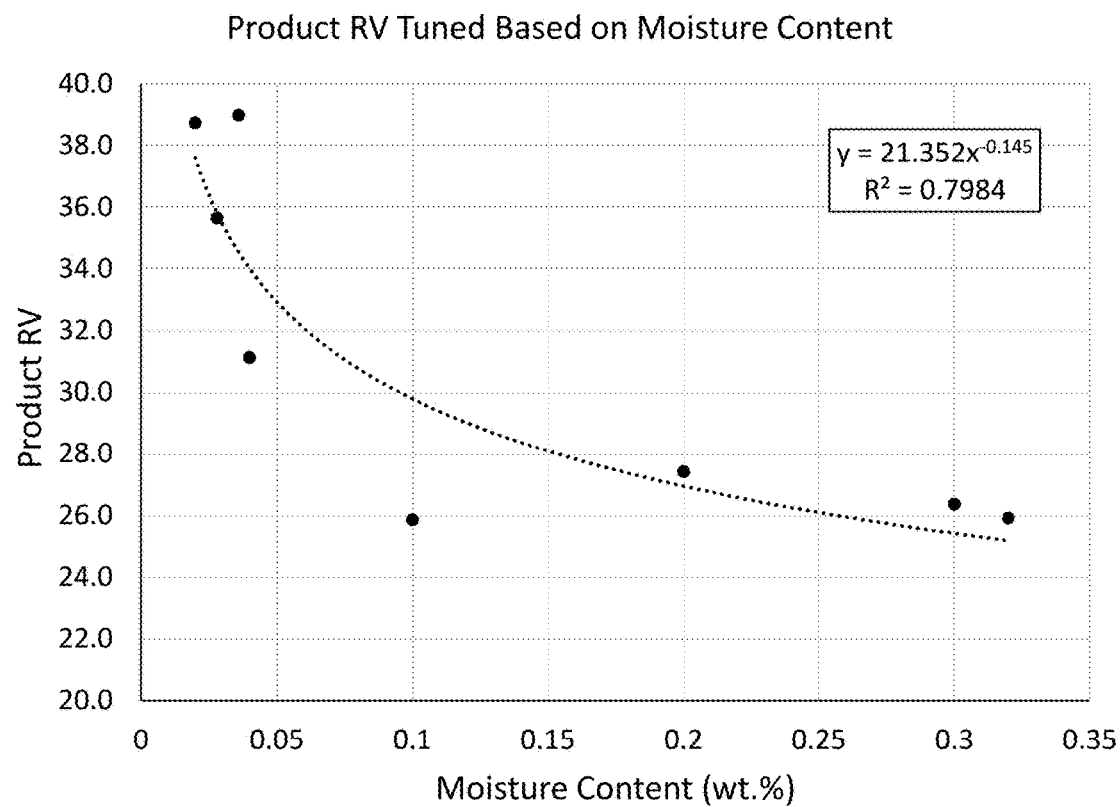
FIG. 9 is a graph demonstrating the tuning of product RV based on the moisture content of the polyamide composition.

Nonwovens were produced using a Nylon 6,6 polyamide composition as the starting resin. The moisture content of the Nylon 6,6 polyamide composition ranged from 0.25 to 0.6 wt. %. The starting RV of the polyamide composition was from about 34.4 to 37.7. In this example, the moisture level was tuned to study its effect on relative viscosity of the nonwoven, which was targeted to be 20 to 40. Fiber diameter was targeted to be from 350 to 700 nm. The results are listed in Table 5 and shown in the chart in FIG. 9.

TABLE 5

Product RV Based on Moisture

| Sample | Moisture (wt. %) | Product RV | Air Pressure (kPa) | Fiber Diameter (nm) |
|---|---|---|---|---|
| 31 | 0.02 | 38.7 | 204.8 | 680 |
| 32 | 0.028 | 35.6 | 184.1 | 540 |
| 33 | 0.036 | 39.0 | 204.8 | 650 |
| 34 | 0.04 | 31.1 | 211.6 | 570 |
| 35 | 0.1 | 25.9 | 195.1 | 390 |
| 36 | 0.2 | 27.4 | 215.1 | — |
| 37 | 0.3 | 26.4 | 193.0 | 550 |
| 38 | 0.32 | 25.9 | 187.5 | 360 |

The results show that by tuning the moisture content of the Nylon 6,6 polyamide, the desired target fiber diameter and RV can be achieved.

Example 10—Product RV Tuned Based on Moisture Content & Channel Temperature

Figure 10:
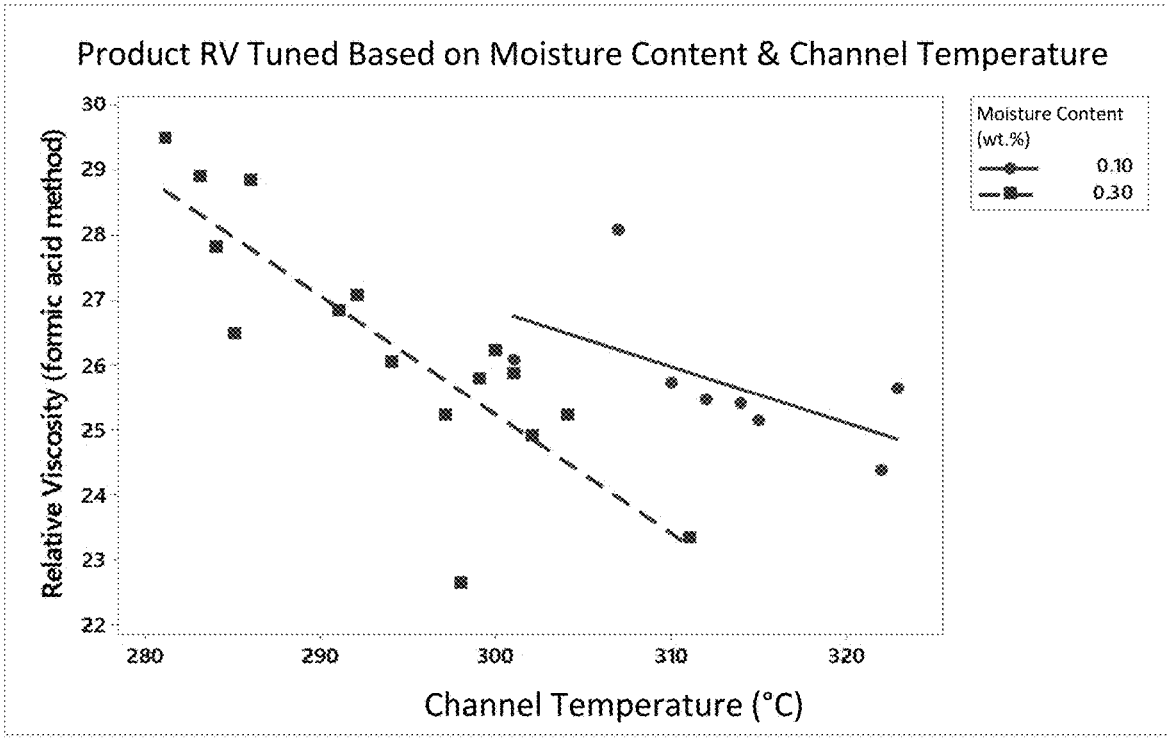
FIG. 10 is a graph demonstrating the tuning of product RV based on the moisture content and channel temperatures.

Nonwovens were produced using a Nylon 6,6 polyamide composition as the starting resin. The moisture content of the Nylon 6,6 polyamide composition ranged from 0.25 to 0.6 wt. %. The starting RV of the polyamide composition was from about 34.4 to 37.7. The polyamide composition moisture and the channel temperature (die temperature) were tuned to arrive at specific relative viscosity (20 to 40) and/or specific nanofiber diameter (350 to 700 nm). The nanofibers were produced by a meltblown process and were free of solvent. The average results are listed in Table 6 and the tuning based on moisture content and channel temperatures is shown by FIG. 10. The RV of the nonwoven product can be tuned by adjusting the polyamide composition moisture and the channel temperature. This shows that tuning the moisture content has larger effect on the RV of the nonwoven product as compared with tuning the channel temperature, although both effects are significant.

For example, at a polyamide composition moisture of 0.02 wt. % and a die temperature of 306° C., the RV of the nonwoven product was 38.7. Increasing the resin moisture to 0.3 wt. % and decreasing the die temperature slightly to 304° C. decreases the RV to 25.2. Similarly, at a polyamide composition moisture of 0.3 wt. % and a die temperature of 301, an RV of 25.9 was measured. Decreasing the polyamide composition moisture to 0.1 wt. % increased the RV to 26.1.

TABLE 6

Tuning RV Based on Moisture Content and Channel Temperatures

| Sample | PA Moisture (wt. %) | Channel Temperature (° C.) | Product RV | Air Pressure (kPa) | Nanofiber Diameter (nm) |
|---|---|---|---|---|---|
| 39 | 0.02 | 306 | 38.7 | 204.8 | 680 |
| 40 | 0.1 | 301 | 26.1 | 197.9 | — |
| 41 | 0.1 | 307 | 28.1 | 184.1 | 390 |
| 42 | 0.1 | 310 | 25.7 | 197.9 | — |
| 43 | 0.1 | 312 | 25.5 | 197.9 | — |
| 44 | 0.1 | 314 | 25.4 | 197.9 | 450 |
| 45 | 0.1 | 315 | 25.1 | 197.9 | 380 |
| 46 | 0.1 | 322 | 24.4 | 199.9 | — |
| 47 | 0.1 | 323 | 25.6 | 197.9 | 360 |
| 48 | 0.3 | 281 | 29.5 | 199.2 | 660 |
| 49 | 0.3 | 283 | 28.9 | 170.3 | 560 |
| 50 | 0.3 | 284 | 27.8 | 181.3 | 620 |
| 51 | 0.3 | 285 | 26.5 | 188.2 | 650 |
| 52 | 0.3 | 286 | 28.9 | 191.6 | 540 |
| 53 | 0.3 | 291 | 26.8 | 182.7 | 560 |
| 54 | 0.3 | 292 | 27.1 | 177.2 | 540 |
| 55 | 0.3 | 294 | 26.1 | 184.1 | 680 |
| 56 | 0.3 | 297 | 25.2 | 186.1 | 440 |
| 57 | 0.3 | 298 | 22.6 | 184.1 | 570 |
| 58 | 0.3 | 299 | 25.8 | 184.1 | 520 |
| 59 | 0.3 | 300 | 26.2 | 194.4 | 490 |
| 60 | 0.3 | 301 | 25.9 | 204.7 | 480 |
| 61 | 0.3 | 302 | 24.9 | 208.2 | 450 |
| 62 | 0.3 | 304 | 25.2 | 228.9 | — |
| 63 | 0.3 | 311 | 23.3 | — | 460 |

The results in Table 6 show the advantages of tuning a characteristic by controlling the moisture content and channel temperature. This allows a processes to obtain different nonwoven products that are made from a melt-blown process.

Example 11—Fiber Diameter Tuned Based on Air Pressure & Channel Temperature

Figure 11:
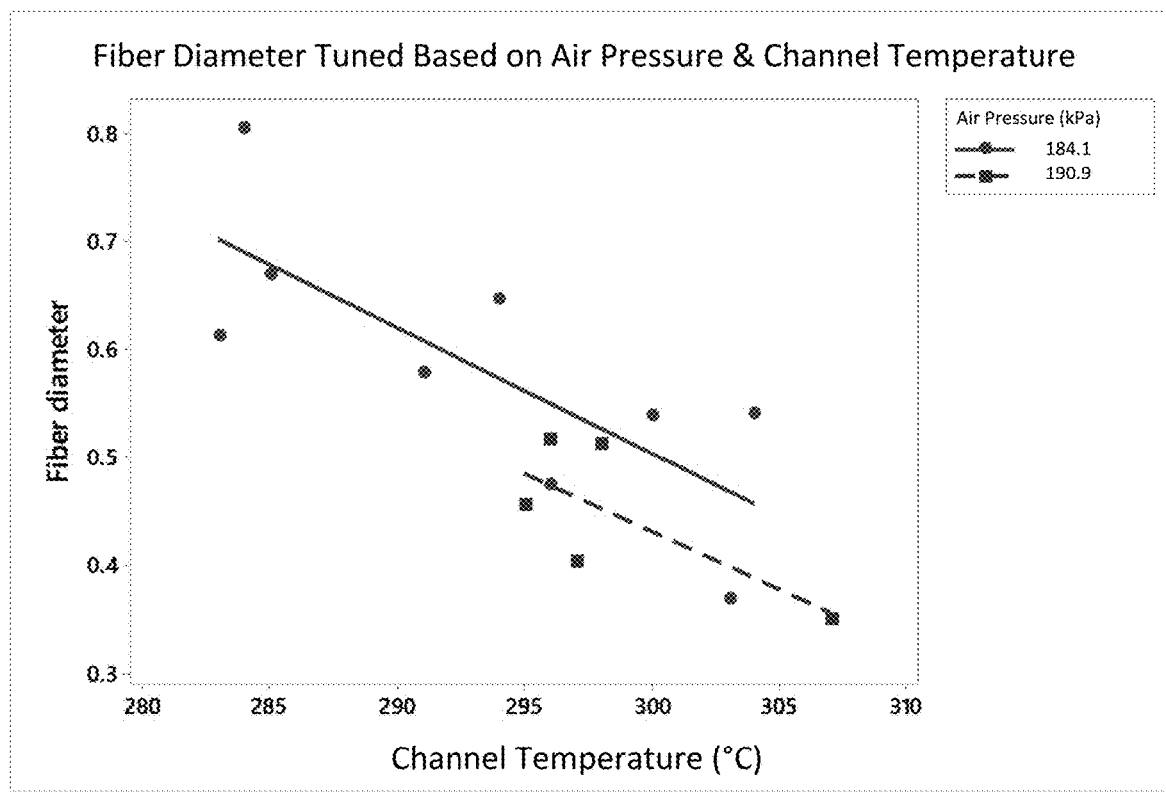
FIG. 11 is a graph demonstrating the tuning of average nanofiber diameter of the nonwoven product based on the air pressure and channel temperatures.

The air pressure and the channel temperature, in particular die temperature, were tuned and the fiber diameter was measured. The results are listed in Table 7, and shown in FIG. 11. Fiber diameter was targeted to be from 300 to 850 nm, with lower diameters (~400 nm) being particularly desired. The fiber diameter of the fabric can be tuned by adjusting the air pressure and the die temperature. For example, at an air pressure of 184.1 kPa (12 psig) and a die temperature of 296° C., the fiber diameter of the fabric was 475 nm. Increasing the air pressure to 190.9 kPa (13 psig) and increasing the die temperature to 297° C. decreased the fiber diameter to 402 nm. A combination of air pressure and die temperature can be selected to yield a specific fiber diameter within a typical amount of experimental and/or sampling variability.

TABLE 7

Tuning Pressure and Die Temperature

| Sample | Air Pressure (kPa) | Die Temperature (° C.) | Fiber diameter (nm) |
|---|---|---|---|
| 64 | 184.1 | 283 | 612 |
| 65 | 184.1 | 284 | 805 |
| 66 | 184.1 | 285 | 669 |
| 67 | 184.1 | 291 | 580 |
| 68 | 184.1 | 294 | 647 |
| 69 | 184.1 | 296 | 475 |
| 70 | 184.1 | 300 | 540 |
| 71 | 184.1 | 303 | 368 |
| 72 | 184.1 | 304 | 540 |
| 73 | 190.9 | 295 | 456 |
| 74 | 190.9 | 296 | 516 |
| 75 | 190.9 | 297 | 402 |
| 76 | 190.9 | 298 | 512 |
| 77 | 190.9 | 307 | 349 |

Example 12—Product RV Tuned Based on Catalyst and Moisture Content

The RV of the nonwoven was tuned by adding a catalyst and setting the moisture at a specific level.

For example, a polyamide 6,6 resin with 150 ppm P can be used to make nanofiber nonwoven fabric using the melt blowing apparatus described in the specification.

A polyamide 6,6 resin that contains this level of phosphorous is commercially available from Ascend Performance Materials under the product type 42 AK2. The initial RV of the resin is 42. The final fabric RV would be estimated to be around 30 when the resin is dried to about 0.3%. The final fabric RV would be estimated around 44 if the resin was dried to about 0.05%.

While the disclosure has been described in detail, modifications within the spirit and scope of the disclosure will be readily apparent to those of skill in the art. Such modifications are also to be considered as part of the present disclosure. In view of the foregoing discussion, relevant knowledge in the art and references discussed above in connection with the Background, the disclosures of which are all incorporated herein by reference, further description is deemed unnecessary. In addition, it should be understood from the foregoing discussion that aspects of the disclosure and portions of various embodiments may be combined or interchanged either in whole or in part. Furthermore, those of ordinary skill in the art will appreciate that the foregoing description is by way of example only, and is not intended to limit the disclosure. Finally, all patents, publications, and applications referenced herein are incorporated by reference in their entireties.

What is claimed is:

1. A method for producing a nanofiber nonwoven product comprising the steps of:
   extruding a polyamide composition comprising N6, N66, N6T/66, N612, N6/66, N6I/66, N66/6I/6T, N11, and/or N12, wherein "N" means Nylon, having a moisture content, with a pressurized gas having a pressure ranging from 160 kPa to 220 kPa through a fiber forming channel having a channel temperature ranging from 270° C. to 315° C. to form nanofibers wherein less than 20% of the nanofibers have a fiber diameter of greater than 700 nm; and
   collecting the nanofibers on a belt to form the nanofiber nonwoven product, wherein greater than 50% of the fibers in the nanofiber nonwoven product are the nanofibers;
   wherein the polyamide nanofiber nonwoven product has an Air Permeability Value of less than 600 CFM/ft$^2$, and
   wherein the moisture content of the polyamide composition is controlled by drying the polyamide composition to have a moisture content from 0.005 wt. % to 1 wt. %, and rehydrating the dried polyamide composition.

2. The method of claim 1, wherein the nanofiber nonwoven product has a basis weight of 150 GSM or less.

3. The method of claim 1, wherein the nanofiber nonwoven product comprises less than 5000 ppm solvent.

4. The method of claim 1, wherein the average nanofiber diameter of the nanofibers is within a range of 100 nm to 1000 nm.

5. The method of claim 1, wherein the average nanofiber diameter of the nanofibers is within a range of 200 nm to 700 nm.

6. The method of claim 1, wherein the relative viscosity of the nanofibers is within a range from 15 to 50.

7. A method for preparing a polyamide nanofiber nonwoven product, comprising:
   (a) providing a polyamide composition comprising N6, N66, N6T/66, N612, N6/66, N6I/66, N66/6I/6T, N11, and/or N12, wherein "N" means Nylon, having a moisture content, and having a relative viscosity (RV) from 2 to 330 for spinning;
   (b) spinning or melt blowing the polyamide composition at a temperature in the range of 215° C. to 315° C. into a plurality of nanofibers; and
   (c) forming the nanofibers into the nanofiber nonwoven product, wherein the nanofiber nonwoven product has a RV from 2 to 330,
   wherein polyamide nanofiber nonwoven product comprises from 1 to 20% of the nanofiber diameters are greater than 700 nanometers; and
   wherein the polyamide nanofiber nonwoven product has an Air Permeability Value of less than 600 CFM/ft$^2$; and
   wherein the moisture content is controlled by drying the polyamide composition to have a moisture content from 0.005 wt. % to 1 wt. %, and rehydrating the dried polyamide composition.

8. The method of claim 7, wherein the polyamide nanofiber nonwoven product has a basis weight of 150 GSM or less.

9. The method of claim 7, wherein the polyamide nanofiber nonwoven product comprises less than 5000 ppm solvent.

10. The method of claim 7, wherein the average nanofiber diameter of the nanofibers is within a range of 100 nm to 1000 nm.

11. The method of claim 7, wherein the average nanofiber diameter of the nanofibers is within a range of 200 nm to 700 nm.

12. The method of claim 7, wherein the relative viscosity of the nanofibers is within a range from 15 to 50.

13. The method of claim 7, wherein polyamide nanofiber nonwoven product comprises from 2 to 17.5% of the nanofiber diameters are greater than 700 nanometers.

* * * * *